US011379174B2

(12) United States Patent
Arai et al.

(10) Patent No.: US 11,379,174 B2
(45) Date of Patent: Jul. 5, 2022

(54) INFORMATION PROCESSING SYSTEM, INFORMATION PROCESSING APPARATUS, AND INFORMATION PROCESSING METHOD

(71) Applicants: Masaki Arai, Tokyo (JP); Hirokazu Iida, Kanagawa (JP)

(72) Inventors: Masaki Arai, Tokyo (JP); Hirokazu Iida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 120 days.

(21) Appl. No.: 16/912,891

(22) Filed: Jun. 26, 2020

(65) Prior Publication Data

US 2021/0004196 A1 Jan. 7, 2021

(30) Foreign Application Priority Data

Jul. 4, 2019 (JP) .............................. JP2019-125544
Jan. 17, 2020 (JP) .............................. JP2020-005943

(51) Int. Cl.
*G06F 3/14* (2006.01)
*H04L 65/401* (2022.01)
*H04L 65/4038* (2022.01)

(52) U.S. Cl.
CPC ........ *G06F 3/1454* (2013.01); *H04L 65/4015* (2013.01); *H04L 65/4038* (2013.01)

(58) Field of Classification Search
CPC ............... G06F 3/1454; H04L 65/4015; H04L 65/4038; H04L 65/1089; H04L 65/403; G09G 2370/027
See application file for complete search history.

(56) References Cited

U.S. PATENT DOCUMENTS

| 7,310,675 | B2* | 12/2007 | Salesky | ................. | G06F 3/1415 |
| | | | | | 709/227 |
| 8,082,509 | B2* | 12/2011 | Orsolini | ................. | G06Q 10/10 |
| | | | | | 715/751 |
| 9,021,367 | B2* | 4/2015 | Chan | ..................... | G06F 3/1454 |
| | | | | | 715/751 |
| 9,049,272 | B2* | 6/2015 | Salesky | ................. | G06F 3/1415 |
| 9,143,570 | B2* | 9/2015 | Khan | ..................... | H04L 67/02 |
| 9,407,724 | B2* | 8/2016 | Khan | ..................... | H04L 67/38 |

(Continued)

FOREIGN PATENT DOCUMENTS

| CN | 110998503 A | * | 4/2020 | ........ H04N 21/2743 |
| JP | 2014-022985 | | 2/2014 | |
| JP | 2015-207108 | | 11/2015 | |

*Primary Examiner* — Yongjia Pan
(74) *Attorney, Agent, or Firm* — IPUSA, PLLC

(57) ABSTRACT

According to one or more embodiments, an information processing system includes a plurality of communication terminals, each installed with a web browser; and an information processing apparatus. The information processing apparatus includes first circuitry configured to: determine occurrence of a trigger to capture an image of a shared screen to be shared by the plurality of communication terminals; generate data of a web page including the image of the shared screen captured based on the occurrence of the trigger; and transmit the data of the web page to the plurality of communication terminals. Each of the plurality of communication terminals includes second circuitry configured to display the web page including the image of the shared screen based on the data received from the information processing apparatus.

13 Claims, 22 Drawing Sheets

(56) References Cited

U.S. PATENT DOCUMENTS

| | | | |
|---|---|---|---|
| 9,733,886 B2* | 8/2017 | Lieb | G06F 3/1454 |
| 10,127,524 B2* | 11/2018 | Burtner | G06Q 50/01 |
| 11,061,547 B1* | 7/2021 | Fieldman | G06F 3/0488 |
| 2004/0083236 A1* | 4/2004 | Rust | G06Q 10/10 |
| 2006/0242632 A1* | 10/2006 | Orsolini | G06Q 10/10 |
| | | | 717/140 |
| 2007/0214423 A1* | 9/2007 | Teplov | G06F 3/1454 |
| | | | 715/751 |
| 2008/0016155 A1* | 1/2008 | Khalatian | G06F 3/038 |
| | | | 709/204 |
| 2008/0059583 A1* | 3/2008 | Mao | H04L 12/1813 |
| | | | 709/205 |
| 2008/0075118 A1* | 3/2008 | Knight | H04L 51/04 |
| | | | 370/474 |
| 2009/0292999 A1* | 11/2009 | LaBine | H04L 12/1827 |
| | | | 715/740 |
| 2011/0173256 A1* | 7/2011 | Khalatian | H04L 67/24 |
| | | | 709/203 |
| 2011/0276619 A1* | 11/2011 | Khan | H04L 67/08 |
| | | | 709/203 |
| 2012/0117156 A1* | 5/2012 | Anka | H04N 7/15 |
| | | | 709/205 |
| 2013/0073965 A1* | 3/2013 | Sik | G09G 5/12 |
| | | | 715/730 |
| 2013/0086487 A1* | 4/2013 | Findlay | G06F 3/04883 |
| | | | 715/753 |
| 2013/0141517 A1* | 6/2013 | Shen | H04N 7/15 |
| | | | 348/14.03 |
| 2014/0019499 A1 | 1/2014 | Arai | |
| 2014/0032735 A1* | 1/2014 | Kapoor | G06F 3/1454 |
| | | | 709/224 |
| 2014/0132702 A1* | 5/2014 | Leibovich | H04N 21/4788 |
| | | | 348/14.08 |
| 2014/0280401 A1 | 9/2014 | Arai | |
| 2015/0007054 A1* | 1/2015 | Qu | H04L 65/1096 |
| | | | 715/753 |
| 2015/0039998 A1* | 2/2015 | Lieb | G06F 3/1454 |
| | | | 715/234 |
| 2015/0077799 A1 | 3/2015 | Arai | |
| 2015/0304254 A1 | 10/2015 | Arai | |
| 2016/0065625 A1* | 3/2016 | Ouyang | H04L 65/80 |
| | | | 715/753 |
| 2016/0094354 A1* | 3/2016 | Zhao | H04L 12/1822 |
| | | | 709/205 |
| 2016/0234276 A1* | 8/2016 | Ouyang | H04L 65/403 |
| 2017/0109519 A1* | 4/2017 | Sugaya | G06F 3/1423 |
| 2017/0223066 A1* | 8/2017 | Grevers, Jr. | H04L 65/1083 |
| 2018/0103074 A1* | 4/2018 | Rosenberg | H04L 65/1069 |
| 2018/0284957 A1* | 10/2018 | Afsari | H04L 65/403 |
| 2018/0343352 A1 | 11/2018 | Hayashi et al. | |

* cited by examiner

FIG. 8

STRUCTURE (A)

| CONTENT MANAGEMENT ID | ROOM ID | CAPTURE IMAGE |
|---|---|---|
| content-1 | room-a | capture_roomA1.jpg |
| content-2 | room-a | capture_roomA2.jpg |
| content-3 | room-a | capture_roomA3.jpg |
| | | |

STRUCTURE (B)

| CONTENT MANAGEMENT ID | USER ID | COMPLETION |
|---|---|---|
| content-1 | User-a | True |
| content-1 | User-b | True |
| content-1 | User-c | True |
| content-2 | User-a | True |
| content-2 | User-c | False |
| | | |

STRUCTURE (C)

| ROOM ID | USER ID |
|---|---|
| room-a | User-a |
| | User-b |
| | User-c |
| room-b | User-x |
| | User-y |
| | |

FIG. 19

STRUCTURE (A)

| USER ID | BASE KEYWORD |
|---------|--------------|
| user-a  | abc          |
| user-b  | 123          |
| user-c  | tanaka       |
|         |              |

STRUCTURE (B)

| KEYWORD            | ROOM (MEETING) ID |
|--------------------|-------------------|
| abc_20190101_1200  | room-a            |
| 123456789          | room-b            |
| Teirei             | room-c            |
|                    |                   |

FIG. 21

```
                                    ┌─2000
┌──────────────────────────────────┐
│  ┌────────────────────────────┐  │
│  │   User ID (ex. user-a)     │  │
│  └────────────────────────────┘  │
│  ┌────────────────────────────┐  │
│  │  Password (ex. fuga123a)   │  │
│  └────────────────────────────┘  │
│  ┌────────────────────────────┐  │
│  │E-mail address (ex. user-a@hoge.com)│
│  └────────────────────────────┘  │
│  ┌────────────────────────────┐  │
│  │   Base keyword (ex. abc)   │  │
│  └────────────────────────────┘  │
│         ┌──────────────┐         │
│         │ Registration │         │
│         └──────────────┘         │
└──────────────────────────────────┘
```

FIG. 22

INFORMATION PROCESSING SYSTEM, INFORMATION PROCESSING APPARATUS, AND INFORMATION PROCESSING METHOD

CROSS-REFERENCE TO RELATED APPLICATIONS

This patent application is based on and claims priority under 35 U.S.C. § 119(a) to Japanese Patent Application Nos. 2019-125544, filed on Jul. 4, 2019, and 2020-005943, filed on Jan. 17, 2020 in the Japan Patent Office, the entire disclosures of which are incorporated herein by reference.

BACKGROUND

Technical Field

The present disclosure relates to an information processing system, an information processing apparatus, and an information processing method.

Description of the Related Art

A method is known according to which electronic files are stored in a storage device on a network and one or more users view the stored electronic files from one or more smart devices (terminal apparatuses). For example, an information processing system is known that allows participants such as a presenter and attendees hold a presentation, a lecture, or the like while causing their smart devices to display the electronic file stored in the storage as described above.

SUMMARY

According to one or more embodiments, an information processing system includes a plurality of communication terminals, each installed with a web browser; and an information processing apparatus. The information processing apparatus includes first circuitry configured to: determine occurrence of a trigger to capture an image of a shared screen to be shared by the plurality of communication terminals; generate data of a web page including the image of the shared screen captured based on the occurrence of the trigger; and transmit the data of the web page to the plurality of communication terminals. Each of the plurality of communication terminals includes second circuitry configured to display the web page including the image of the shared screen based on the data received from the information processing apparatus.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is an illustration of an example of data structure of a content management database (DB), according to an embodiment of the present disclosure;

FIG. 19 is an illustration of an example of data structure of a keyword management DB, according to an embodiment of the present disclosure;

FIG. 21 is an illustration of an example of a UI that allows a user to register a base keyword concurrently with user registration, according to an embodiment of the present disclosure;

FIG. 22 is an illustration of an example of a UI that displays a room (meeting) generation result and a keyword registration result, according to an embodiment of the present disclosure;

Figure 1:
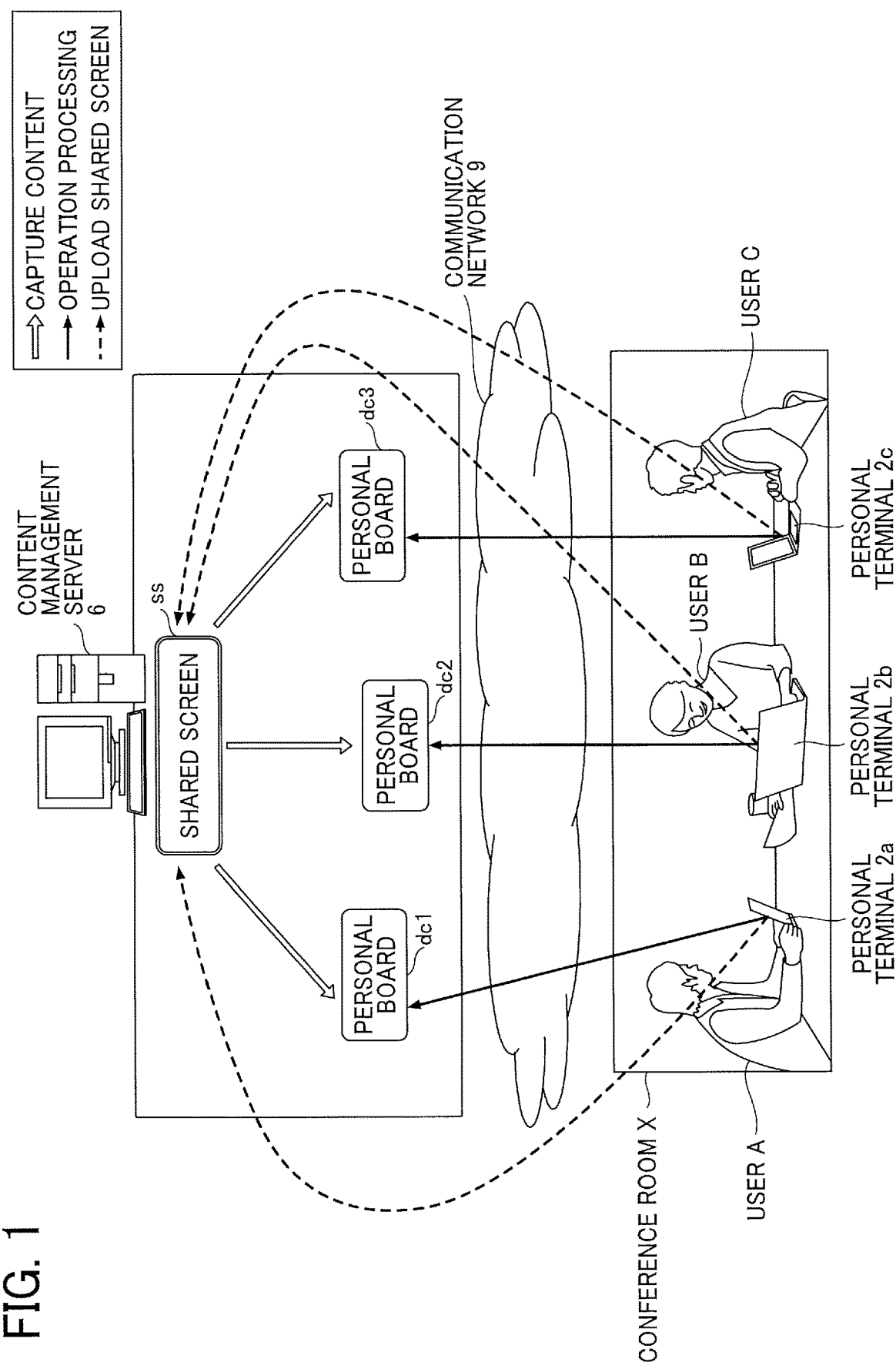
FIG. 1 is a schematic diagram illustrating an overview of an information sharing system used in a meeting being conducted, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described in detail below, with reference to the drawings. Although a description given hereinafter is of an example of an information sharing system used in a meeting, seminar, lecture, class or the like. However, this is just an example, and the embodiments are applied to various kinds of information processing system. In the embodiments, in one example, all users are in the same room such as a conference room. In another example, users who are connected through a network are in physically separated rooms. A description is given hereinafter of an example in which the information sharing system according to the present embodiment is used in a meeting.

First Embodiment

Overview of Information Sharing System Used in Meeting:

First, with reference to FIG. 1, an overview of an information sharing system according to the present embodiment is described. In the embodiment, a meeting is being held using the information sharing system. FIG. 1 is a schematic diagram illustrating an overview of the information sharing system used in a meeting being conducted, according to the present embodiment. FIG. 1 illustrates an example case in which a user A, a user B, and user C who are in a meeting room X of a company are conducting a remote meeting by using the information sharing system. In the meeting room X, the user A uses a personal terminal 2a, the user B uses a personal terminal 2b, and the user C uses a personal terminal 2c. In the following description, the personal terminal 2a, the personal terminal 2b, and the personal terminal 2c are collectively referred to as simply a "personal terminal 2" or "personal terminals 2", unless these terminals need to be distinguished from each other. Further, in the following, an example is described in which the user A is a presenter, and the user B and user C are attendees.

The personal terminal 2 is a computer that a user can use individually or exclusively and whose screen is viewed (browsed) by the user individually. The personal terminal 2 is not limited to being privately-owned. The personal terminal 2 may be public, private, non-profit, rental or any other type of ownership terminal in which a user may individually or exclusively use the terminal and whose screen is viewed by the user individually. Examples of the personal terminal 2 include, but not limited to, a laptop computer, a desktop personal computer (PC), a mobile phone, a smartphone, a tablet terminal, and a wearable PC. The personal terminal 2 is an example of a communication terminal (or an information processing terminal).

The personal terminal 2 is communicable with a content management server 6 through a communication network 9 such as the Internet. The communication network 9 is, for example, one or more local area networks (LANs) inside the firewall. In another example, the communication network 9 includes the Internet that is outside the firewall in addition to the LAN. In still another example, the communication network 9 further includes a virtual private network (VPN) and/or a wide-area Ethernet (registered trademark). The communication network 9 is any one of a wired network, a wireless network, and a combination of the wired network and the wireless network. In a case where the content management server 6 and the personal terminal 2 connects to the communication network 9 through a mobile phone network such as 3G, Long Term Evolution (LTE), 4G, the LAN can be omitted.

The content management server 6 is a computer functioning as a web server (or HTTP server) that stores and manages data of contents to be transmitted to the personal terminal 2. The content management server 6 includes a storage unit 6000 described below.

The storage unit 6000 includes storage locations (or storage areas) for implementing personal boards dc1 to personal board dc3, which are accessible only from each personal terminal 2. Specifically, only the personal terminal 2a, the personal terminal 2b and the personal terminal 2c can access a personal board dc1, a personal board dc2 and a personal board dc3, respectively. In the following description, the personal board dc1, the personal board dc2, and the personal board dc3 are collectively referred to as simply a "personal board dc", unless these boards need to be distinguished from each other. In one example, the content management server 6 supports cloud computing. The "cloud computing" refers to internet-based computing where resources on a network are used or accessed without identifying specific hardware resources. The storage unit 6000 of the content management server 6 includes a storage location (or storage area) for implementing a shared screen ss described below.

The "personal board dc" is a virtual space generated in the storage location (or the storage area) in the storage unit 6000 of the content management server 6. For example, the personal board de is accessible by using a web application having a function of allowing a user to view and edit contents with the Canvas element and JavaScript (registered trademark).

The "web application" refers to software used on a web browser application (hereinafter referred to as a "web browser", in order to simplify the description). The web application is implemented by a program written in a script language such as JavaScript (registered trademark) that operates on the web browser and a program on a web server side, which operate in cooperation with each other. Further, the web application refers to a mechanism that implements such software. The personal board dc has a finite or an infinite area within the range of the storage area in the storage unit 6000. For example, the personal board dc may be finite or infinite both in the vertical and horizontal directions. In another example, the personal board de may be finite or infinite in either the vertical direction or the horizontal direction.

The "shared screen ss" is a virtual space generated in the storage location (or the storage area) in the storage unit 6000 of the content management server 6. The shared screen ss has a function of holding content data that is uploaded by streaming from the personal terminal 2a of the user A, who is the presenter, until next content data is acquired. The shared screen ss is a computer screen such as an application screen. The shared screen ss is a capturing target of a capture image, as described below.

The personal board do is an electronic space dedicated to each of users participating in the meeting. The personal terminal 2 of each user can access only the personal board d dedicated to the corresponding user, which allows the corresponding user to view and/or edit (input, delete, copy, etc.) contents such as characters and images on the accessed personal electronic canvas.

The content management server 6 stores, for each virtual conference room, information (data) such as contents developed on the shared screen ss and the personal board dc in association with the corresponding virtual conference room. The virtual conference room is an example of a virtual room. Hereinafter, the virtual conference room is referred to as a "room", in order to simplify the description. Thereby, even when the content management server 6 manages plural rooms, data of a content are not communicated over different rooms.

Each personal terminal 2 causes the web application operating on the web browser installed in the personal terminal 2 to access the contents of the personal board dc and the shared screen ss of the room in which the user participates. Thus, the meeting is held in a manner that is close to a meeting held in the real conference room.

In the information sharing system, the user A, who is a presenter, causes a capture image of a content uploaded to the shared screen ss to be taken into the personal board de of the users B and the user C, who are attendees, as a personal document, as described below.

Figure 2:
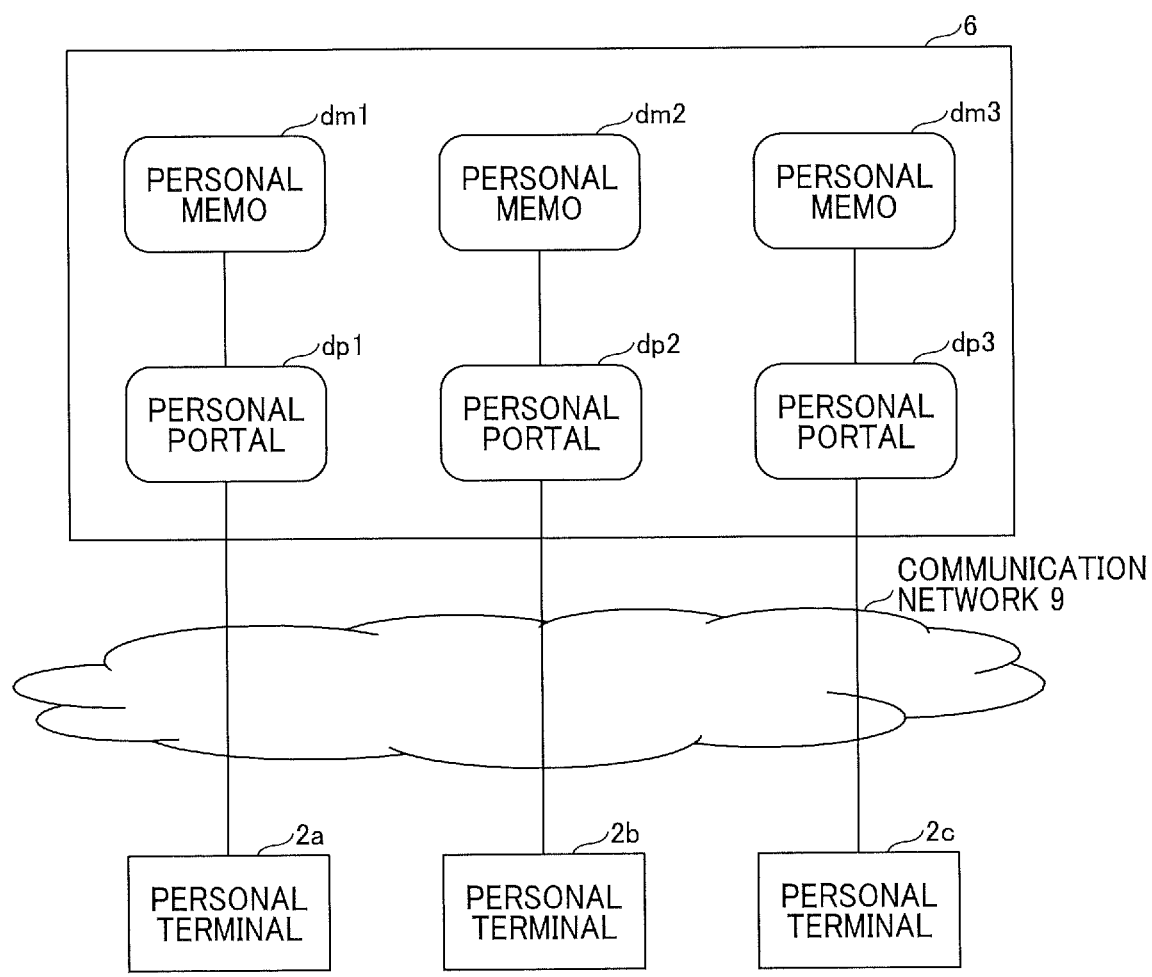
FIG. 2 is a diagram illustrating an example of an overview of a personal portal in the information sharing system, according to an embodiment of the present disclosure.

Overview of Personal Portal in Information Sharing System:

A description is now given of an overview of a personal portal, with reference to FIG. 2. FIG. 2 is a diagram illustrating an example of an overview of a personal portal in the information sharing system. The content management server 6 generates data for a personal portal screen dp1, a personal portal screen dp2, and a personal portal screen dp3 dedicated to the personal terminal 2a, the personal terminal 2b, and the personal terminal 2c, respectively, to cause the personal terminals 2 to perform display based on the generated data. In the following description, the personal portal screen dp1, the personal portal screen dp2, and the personal portal screen dp3 are collectively referred to a simply a "personal portal screen dp", unless these portal screens need to be distinguished from each other.

The content management server 6 stores and manages a personal memo dm1, a personal memo dm2, and a personal memo dm3, which are contents edited on the personal board dc1, the personal board dc2, and the personal board dc3, respectively. In the following description, the personal memo dm1, the personal memo dm2, and the personal memo dm3 are collectively referred to as simply a "personal memo dm", unless these personal memos need to be distinguished from each other. Each user accesses the personal portal screen dp dedicated to each personal terminal 2, to cause a list of meetings in which the user who operates the corresponding personal terminal 2 has participated to be displayed.

The user can cause the personal memo dm of each meeting and reference information of the meeting to be displayed from a list of meetings displayed on the personal portal screen dp, as described below. Thus, for example, when a user wants to look back contents of meetings, the user can cause the personal memo dm of a desired meeting and the reference information of the desired meeting to be displayed in a simple manner. Further, each user accesses the personal portal screen dp dedicated to each personal terminal 2, to search a list of the meetings of the user operating the corresponding personal terminal 2 for a desired meeting by using a keyword (text). For example, the reference information of the meeting, text data and handwritten characters included in the personal memo dm, and the evaluation of the meeting by the user are searched through by using characters (text). Note that the reference information of the meeting is included in the meeting information.

Figure 3:
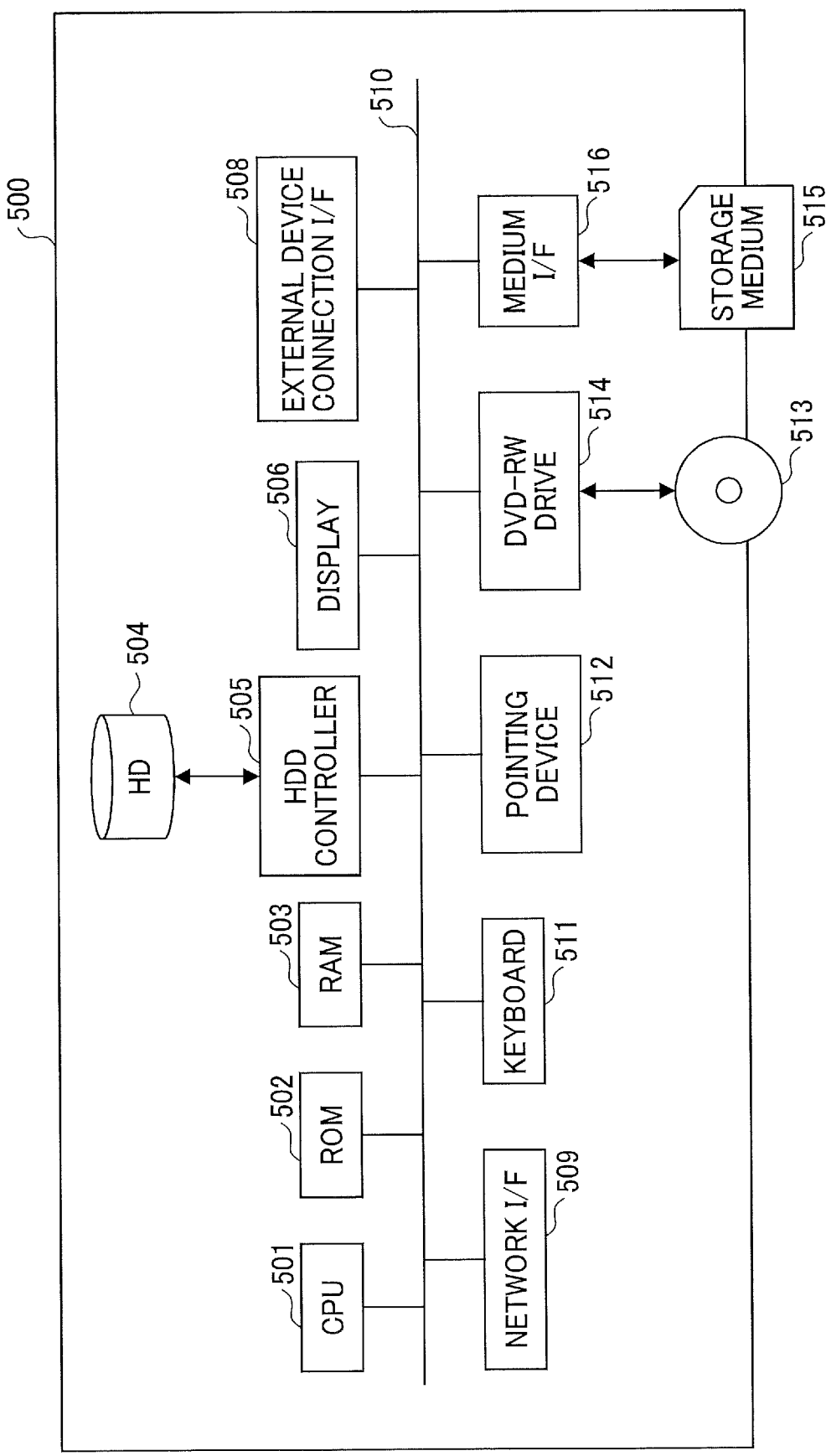
FIG. 3 is a block diagram illustrating an example of a hardware configuration of a computer, according to an embodiment of the present disclosure.

Hardware Configuration:

Hardware Configuration of Computer:

The content management server 6 is implemented by, for example, a computer 500 having a hardware configuration illustrated in FIG. 3. Further, when the personal terminal 2 is a PC, which is an example of an information processing terminal, the PC is also implemented by the computer 500 having a hardware configuration illustrated in FIG. 3, for example.

FIG. 3 is a block diagram illustrating an example of a hardware configuration of the computer 500, according to the present embodiment. As illustrated in FIG. 3, the computer 500 includes a central processing unit (CPU) 501, a read only memory (ROM) 502, a random access memory (RAM) 503, a hard disk (HD) 504, a hard disk drive (HDD) controller 505, and a display 506, an external device connection interface (I/F) 508, a network I/F 509, a data bus 510, a keyboard 511, a pointing device 512, a digital versatile disk rewritable (DVD-RW) drive 514, and a medium I/F 516.

The CPU 501 controls entire operation of the computer 500. The ROM 502 stores a program for controlling the CPU 501, such as an initial program loader (IPL). The RAM 503 is used as a work area for the CPU 501. The HD 504 stores various data such as a program. The HDD controller 505 controls reading and writing of various data from and to the HD 504 under control of the CPU 501.

The display 506 displays various information such as a cursor, menu, window, character, and image. The external device connection I/F 508 is an interface that connects the computer 500 to various external devices. Examples of the external devices include, but not limited to, a universal serial bus (USB) memory and a printer. The network I/F 509 is an interface that controls communication of data with an external device through the communication network 9. Examples of the data bus 510 include, but not limited to, an address bus and a data bus, which electrically connects the components such as the CPU 501 with one another.

The keyboard 511 is one example of an input device provided with a plurality of keys for allowing a user to input characters, numerals, or various instructions. The pointing device 512 is an example of an input device that allows a user to select or execute a specific instruction, select a target for processing, or move a cursor being displayed. The DVD-RW drive 514 reads and writes various data from and to a DVD-RW 513, which is an example of a removable storage medium. The removable storage medium is not limited to the DVD-RW and may be a digital versatile disc-recordable (DVD-R) or the like. The medium I/F 516 controls reading and writing (storing) of data from and to a storage medium 515 such as a flash memory.

Figure 4:
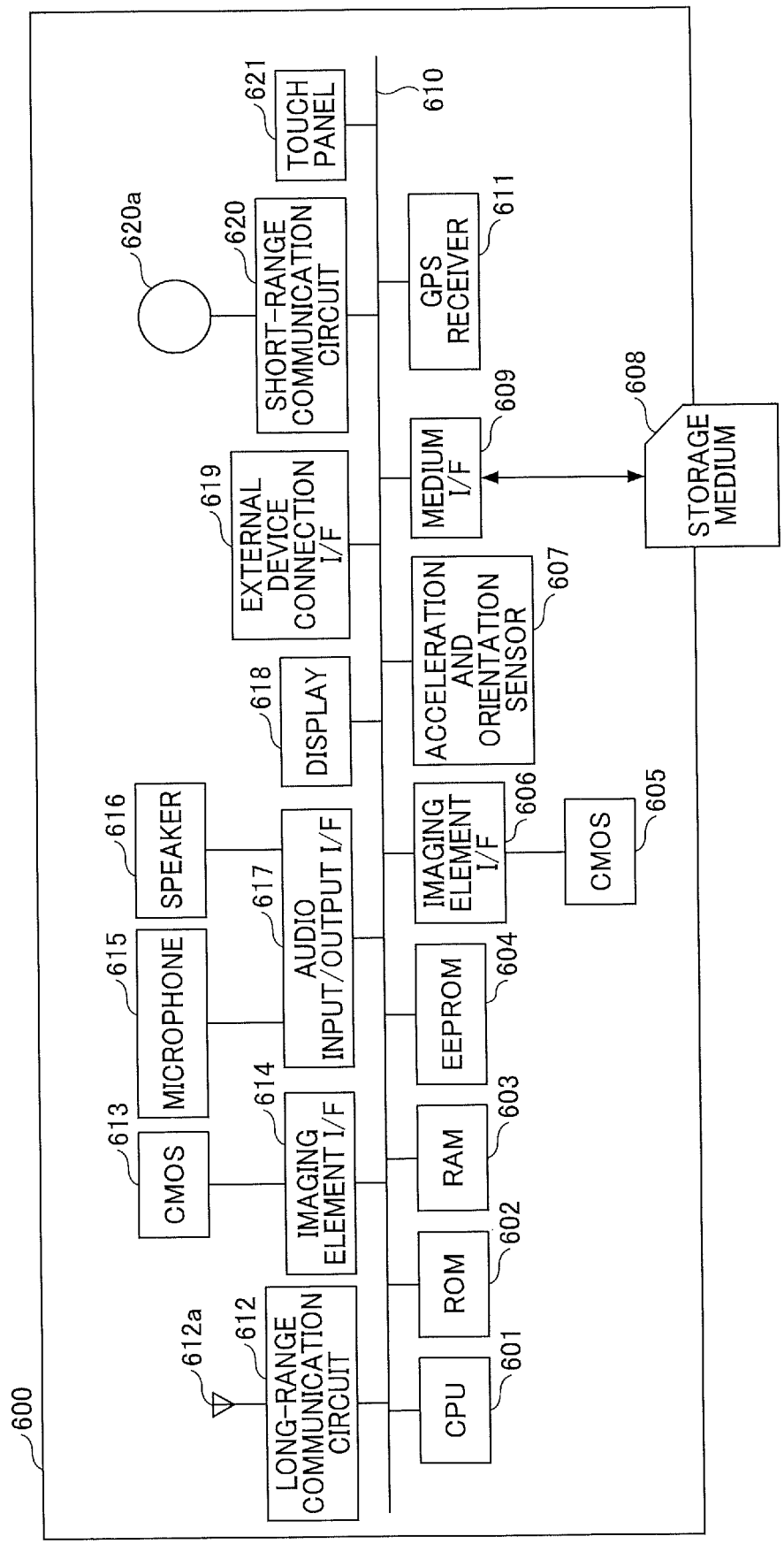
FIG. 4 is a block diagram illustrating an example of a hardware configuration of a smartphone, according to an embodiment of the present disclosure.

Hardware Configuration of Smartphone:

The personal terminal 2, which is an example of the information processing terminal, can be implemented by, for example, a smartphone 600 having a hardware configuration illustrated in FIG. 4.

FIG. 4 is a block diagram illustrating an example of a hardware configuration of the smartphone 600, according to the present embodiment. As illustrated in FIG. 4, the smartphone 600 includes a CPU 601, a ROM 602, a RAM 603, an electrically erasable and programmable ROM (EEPROM) 604, a complementary metal oxide semiconductor (CMOS) sensor 605, an imaging element I/F 606, an acceleration and orientation sensor 607, a medium I/F 609, and a global positioning system (GPS) receiver 611.

The CPU 601 controls entire operation of the smartphone 600. The ROM 602 stores a control program for controlling the CPU 601, such as an IPL. The RAM 603 is used as a work area for the CPU 601. The EEPROM 604 reads or writes various data such as a control program for a smartphone under control of the CPU 601.

The CMOS sensor 605 is an example of an imaging device that captures an object (mainly, a self-image of a user operating the smartphone 600) under control of the CPU 601 to obtain image data. In alternative to the CMOS sensor 605, an imaging element such as a charge-coupled device (CCD) sensor can be used. The imaging element I/F 606 is a circuit that controls driving of the CMOS sensor 605. The acceleration and orientation sensor 607 includes various sensors such as an electromagnetic compass for detecting geomagnetism, a gyrocompass, and an acceleration sensor.

The medium I/F 609 controls reading and writing (storing) of data from and to a storage medium 608 such as a flash memory. The GPS receiver 611 receives a GPS signal from a GPS satellite.

The smartphone 600 further includes a long-range communication circuit 612, a CMOS sensor 613, an imaging element I/F 614, a microphone 615, a speaker 616, an audio input/output I/F 617, a display 618, an external device connection I/F 619, a short-range communication circuit 620, an antenna 620a for the short-range communication circuit 620, and a touch panel 621.

The long-range communication circuit 612 is a circuit that enables the smartphone 600 to communicate with other device through the communication network 9. The CMOS sensor 613 is an example of a built-in imaging device that captures an object under control of the CPU 601 to obtain image data. The imaging element I/F 614 is a circuit that controls driving of the CMOS sensor 613. The microphone 615 is a built-in circuit that converts sound into an electric signal. The speaker 616 is a built-in circuit that generates sound such as music or voice by converting an electric signal into physical vibration.

The audio input/output I/F 617 is a circuit for inputting or outputting an audio signal between the microphone 615 and the speaker 616 under control of the CPU 601. The display 618 is an example of a display device that displays an image of a subject, various icons, etc. The display 618 is configured as a liquid crystal display or an organic electroluminescence (EL) display, for example.

The external device connection I/F 619 is an interface that connects the smartphone 600 to various external devices. The short-range communication circuit 620 is a communication circuit that communicates in compliance with the near field communication (NFC), the Bluetooth (Registered Trademark), and the like. The touch panel 621 is an example of an input device that enables a user to operate the smartphone 600 by touching a screen of the display 618.

The smartphone 600 further includes a bus line 610. Examples of the bus line 610 include, but not limited to, an address bus and a data bus, which electrically connects the components illustrated in FIG. 4 such as the CPU 601.

Figure 7:
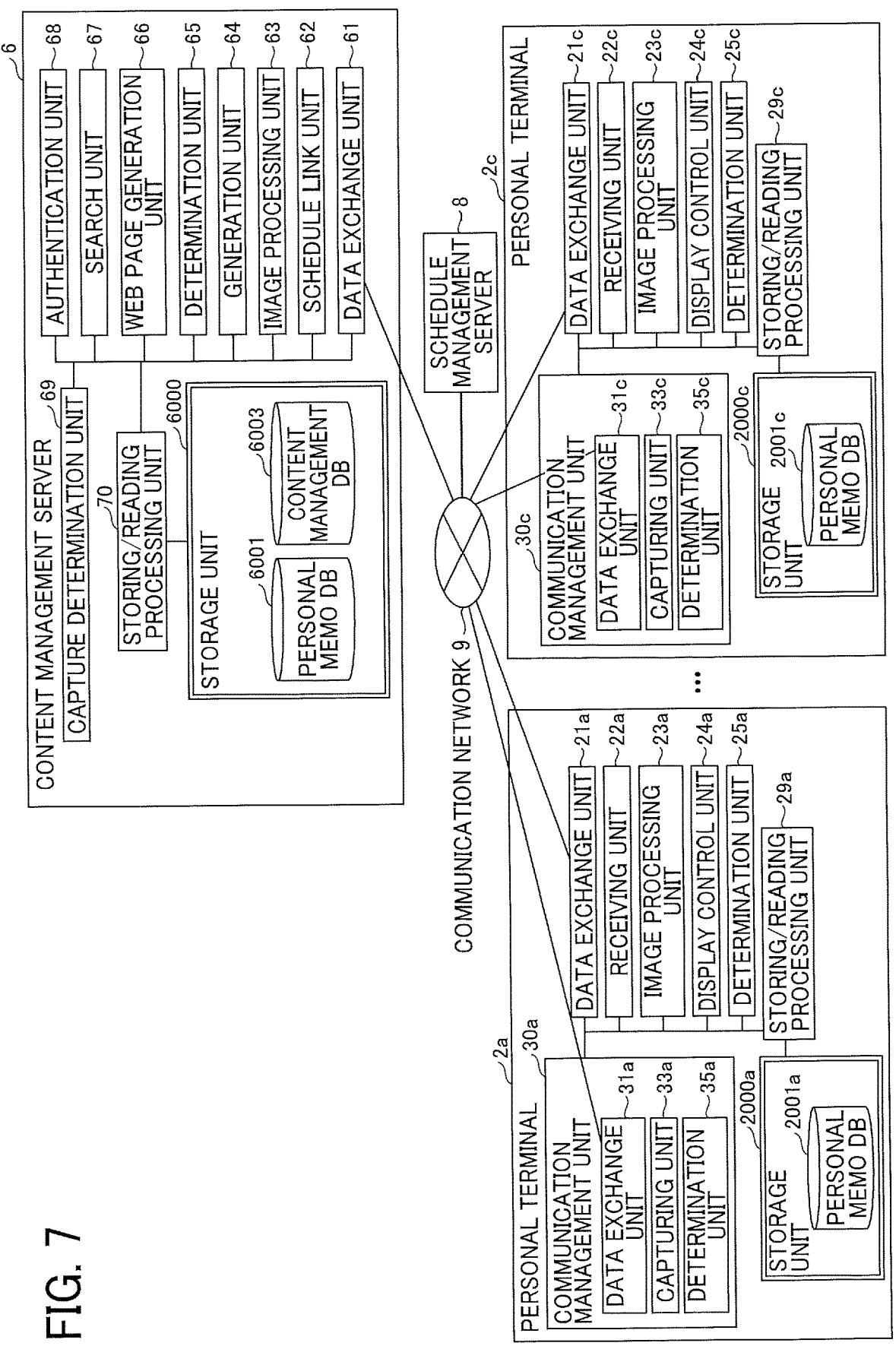
FIG. 7 is a block diagram illustrating an example of a functional configuration of a personal terminal and a content management server of the information sharing system, according to an embodiment of the present disclosure.

Functional Configuration:

With reference to FIG. 7, a description is now given of an example of a functional configuration of the personal terminal 2 and the content management server 6 of the information sharing system. FIG. 7 is a block diagram illustrating an example of a functional configuration of the personal terminal 2 and the content management server 6 of the information sharing system.

Functional Configuration of Personal Terminal:

First, a description is given of an example of a functional configuration of the personal terminal 2. As illustrated in FIG. 7, the personal terminal 2 includes a data exchange unit 21, a receiving unit 22, an image processing unit 23, a display control unit 24, a determination unit 25, a storing/reading processing unit 29, and a communication management unit 30. These units are functions or means implemented by or caused to function by operating one or more hardware components illustrated in FIG. 3 in cooperation with instructions of the CPU 501 according to the program loaded from the HID 504 to the RAM 503. The personal terminal 2a further includes a storage unit 2000a, which is implemented by the RAM 503 and the HD 504 illustrated in FIG. 3.

The data exchange unit 21, the receiving unit 22, the image processing unit 23, the display control unit 24, the determination unit 25, and the storing/reading processing unit 29 are implemented by the web browser (the web application of the web browser) that displays a personal board screen described below. The communication management unit 30 is implemented by a dedicated communication application.

Each Functional Unit of Personal Terminal:

Next, a detailed description is given of each functional unit of the personal terminal 2. The data exchange unit 21 transmits and receives various data (or information) to and from other terminals, apparatuses, servers, etc. through the communication network 9. For example, the data exchange unit 21 receives, from the content management server 6, content data described in a hypertext markup language (HTML), Cascading Style Sheet (CSS), and JavaScript (registered trademark). In addition, the data exchange unit 21 transmits operation information input by the user to the content management server 6.

The receiving unit 22 receives various selections or instructions input by the user using the keyboard 511 and the pointing device 512. The image processing unit 23 performs processing such as generating vector data (or stroke data) according to drawing by the user, for example. The image processing unit 23 has a function as a capturing unit. For example, the image processing unit 23 shoots a capture of the shared screen ss to capture a capture image.

The display control unit 24 controls the display 506 to display a personal board screen described below. The determination unit 25 performs various determinations. The storing/reading processing unit 29 is implemented by instructions from the CPU 501, and the HDD controller 505, the medium I/F 516, and the DVD-RW drive 514. The storing/reading processing unit 29 stores various data in the storage unit 2000*a*, the DVD-RW 513, and the storage medium 515, and reads the various data from the storage unit 2000*a*, the DVD-RW 513, and the storage medium 515.

The communication management unit 30, which is implemented mainly by instructions of the CPU 501 illustrated in FIG. 3, performs data input/output with the data exchange unit 21, for example. The communication management unit 30 further includes a data exchange unit 31, a capturing unit 33, and a determination unit 35.

The data exchange unit 31 transmits and receives various data (or information) to and from the content management server 6 through the communication network 9, independently of the data exchange unit 21. The capturing unit 33 basically has the same function as the image processing unit 23 as the capturing unit. For example, the capturing unit 33 performs screen capturing of the shared screen ss described below, to acquire capture image. The determination unit 35 performs various determinations.

Functional Configuration of Content Management Server:

A description is now given of an example of a functional configuration of the content management server 6. As illustrated in FIG. 7, the content management server 6 includes a data exchange unit 61, a schedule link unit 62, an image processing unit 63, a generation unit 64, a determination unit 65, a web page generation unit 66, a search unit 67, an authentication unit 68, a capture determination unit 69, and a storing/reading processing unit 70. These units are functions or means implemented by or caused to function by operating one or more hardware components illustrated in FIG. 3 in cooperation with instructions of the CPU 501 according to the program loaded from the HD 504 to the RAM 503. The content management server 6 further includes a storage unit 6000, which is implemented by the RAM 503 and the HD 504 illustrated in FIG. 3.

Each Functional Unit of Content Management Server:

Next, a detailed description is given of each functional unit of the content management server 6. The data exchange unit 61 transmits and receives various data (or information) to and from other terminals, apparatuses, servers, etc. through the communication network 9. The schedule link unit 62 acquires schedule information including reference information of the meeting in which the user participates from a schedule management server 8. The schedule management server 8 is connected to the communication network 9 so that various data (or information) can be transmitted and received. The schedule management server 8 stores schedule information (meeting (list) information) for each user (each user ID).

The image processing unit 63 has a function as a capturing unit, and performs screen capturing of the shared screen ss described below, to acquire capture image. The generation unit 64 generates a unique content management ID and a unique personal memo ID. The determination unit 65 determines whether the content management ID and/or the personal memo ID has been received by the data exchange unit 61.

The web page generation unit 66 generates data of a web page to be displayed on the web browser of the personal terminal 2. The search unit 67 accepts a search request from a personal portal screen, which is described below, displayed on the web browser of the personal terminal 2 and performs a search according to the accepted search request. The authentication unit 68 performs user authentication processing. The authentication unit 68 can be provided in any suitable sources other than the content management server 6. For example, an authentication server connected to the communication network 9 can be used. The capture determination unit 69 determines the occurrence of a trigger for shooting the capture of the shared screen ss to capture the capture image. Examples of the occurrence of trigger for capturing the capture image include a capture image capturing request by the presenter or the representative, a capture image capturing request by the attendee, and a change amount of the image on the shared screen ss. A detailed description is given later of the occurrence of trigger.

The storing/reading processing unit 70 is implemented by instructions from the CPU 501, and the HDD controller 505, the medium I/F 516, and the DVD-RW drive 514. The storing/reading processing unit 70 stores various data in the storage unit 6000, the DVD-RW 513, and the storage medium 515, and reads the various data from the storage unit 6000, the DVD-RW 513, and the storage medium 515.

The storage unit 6000 of the content management server 6 includes a personal memo database (DB) 6001 and a content management DB 6003.

Note that these data may be stored in any suitable server other than the content management server 6. In this case, the data is acquired and transmitted from other server each time the personal terminal 2 sends a request for data acquisition and transmission. In another example, the data is stored in the content management server 6 during the meeting or while the personal board de is referenced by the user, and the data can be deleted from the content management server 6 and sent to other server after the end of the meeting or the reference (or after a certain period of time).

The apparatuses or devices described in the embodiment are just one example of plural computing environments that implement one or more embodiments in this disclosure. In an embodiment, the content management server 6 includes plural computing devices, such as a server cluster. The plural computing devices are configured to communicate with one another through any type of communication link, including a network and a shared memory, etc., and perform the processes described in this disclosure. In substantially the same manner, the personal terminal 2 can include multiple computing devices configured to communicate with one another.

Further, the content management server 6 and the personal terminal 2 can be configured to share the disclosed processes in various combinations. For example, a part of processes to be executed by the content management server 6 can be executed by the personal terminal 2. Further, elements of the content management server 6 and the personal terminal 2 can be provided by one apparatus or can be provided by a plurality of apparatuses.

DB Structure:

Content Management DB:

FIG. 8 is an illustration of an example of data structure of the content management DB 6003. The storage unit 6000 of the content management server 6 includes the content management DB 6003 as illustrated in FIG. 8. The content management DB 6003 in FIG. 8 is configured by a combination of structures (A) to (C).

The structure (A) associates a room ID with a capture image, for each content management ID as a main key. The structure (B) associates a user ID with a completion flag, for each content management ID as a main key. The structure (C) associates the room ID with one or more user IDs.

The content management ID is an example of identification information for managing content. The room ID is an example of identification information of the room. The captured image is an example of identification information of a capture image of the shared screen ss. The user ID is an example of user identification information. The completion flag is an example of information indicating whether or not the content is registered in the personal memo dm of the personal terminal 2. For example, the completion flag "False" indicates that the content is not registered in the personal memo dm of the personal terminal 2. The completion flag "True" indicates that the content is registered in the personal memo dm of the personal terminal 2.

In the structure (A), the room ID and the capture image are registered in association with the content management ID when a capture shooting process described below is executed. For example, in the structure (A) of FIG. 8, "capture_roomA1.jpg", "capture_roomA2.jpg", and "capture_roomA3.jpg" are registered in the room identified by the room ID "room-a". In the structure (C), the user IDs "User-a", "User-b", and "User-c" participating in the room identified by the room ID "room-a" are registered.

In the structure (B), based on the structures (A) and (C), for each of contents registered in the room identified by the room ID "room-a", information indicating whether the content is registered in the personal memo dm of the personal terminal 2 of each of the user ID "User-a", "User-b" and "User-c" participating in the room as the completion flag.

Using the content management DB 6003 of FIG. 8, the content management server 6 can manage the contents (capture images) registered in the room, and can manage the presence or absence of the contents registered in the personal memo dm for each user participating in the room.

Personal Memo DB:

The personal memo DB 6001 stores data such as the personal memo ID, the content management ID, memo data, and a display position in association with one another. The personal memo ID is an example of identification information of a memo such as input text or a drawn object. The content management ID is an example of identification information of a registered content (capture image). The memo data is data of the memo such as the input text and the drawn object. The display position indicates a position (coordinates, number of lines, number of characters, etc.) at which the memo such as input text or the drawn object is displayed.

Processes or Operation:

A description is given now of an operation or processes according to the present embodiment. In the present embodiment, an example is described in which in a meeting conducted by the room, the user A, who operates the personal terminal 2a, uploads (streams) content data to the shared screen ss, and the user B and the user C, who respectively operate the personal terminal 2b and the personal terminal 2c participate in the meeting. The user A is an example of a presenter. Each of the user B and the user C is an example of an attendee.

Figure 9:
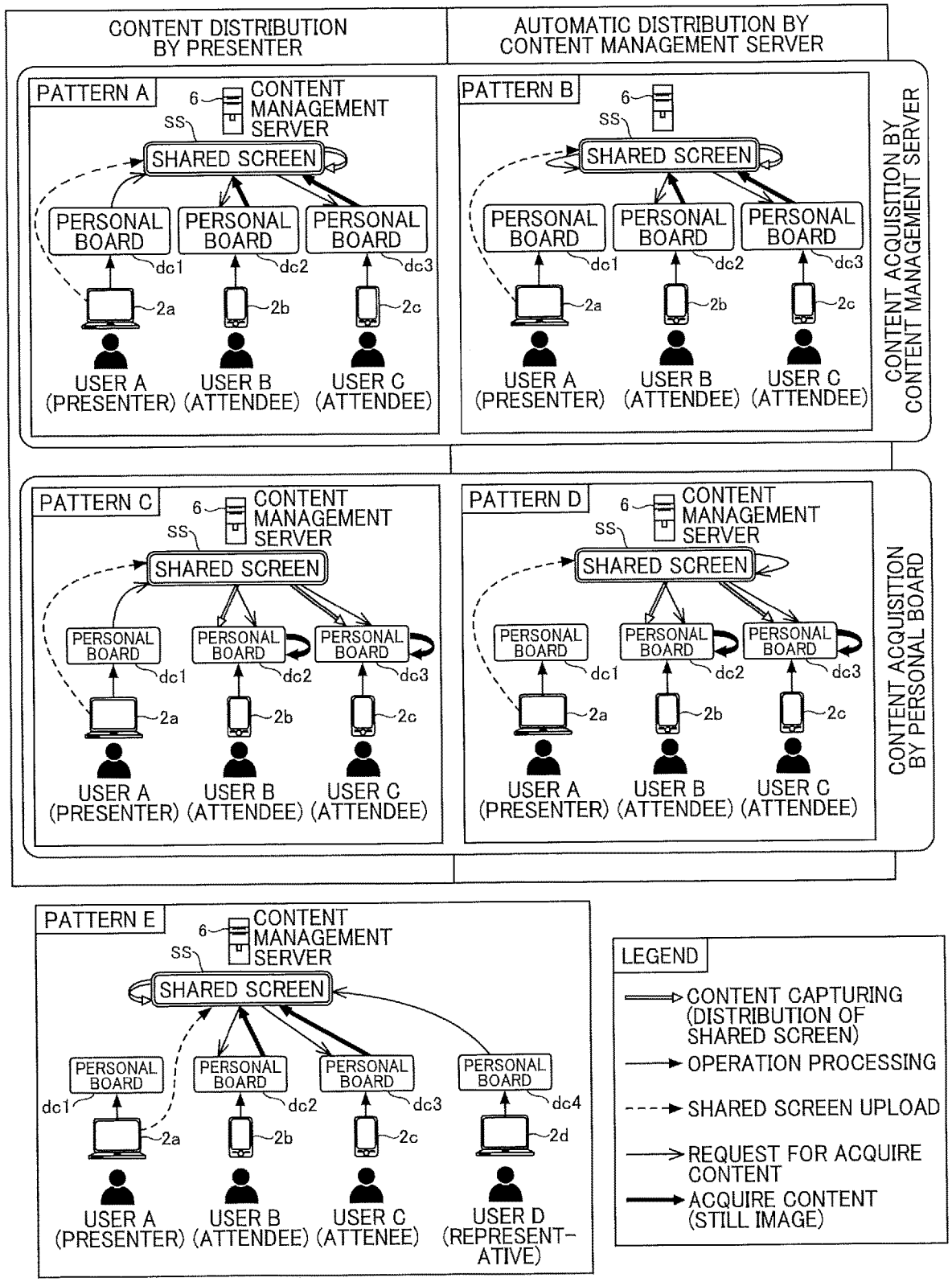
FIG. 9 is an illustration of example patterns of content distribution and content acquisition, according to an embodiment of the present disclosure.

FIG. 9 is an illustration of example patterns of content distribution and content acquisition. In FIG. 9, there are five patterns depending on the difference in triggers for starting capture shooting process, which is described below, and the difference in the terminals or server which performs the capture shooting process. Specifically, FIG. 9 illustrates content distribution by the presenter, automatic distribution by the content management server 6, and content distribution by a representative, as the difference in the triggers for starting the capture shooting process. The representative is a user D, who is neither a presenter nor an attendee. Further, FIG. 9 illustrates content acquisition by the content management server 6 and content acquisition by the personal board d (personal terminal 2), as the difference in the terminals or server which performs the capture shooting process.

The content distribution by the presenter is an example in which the capture shooting process is performed according to the presenter's operation. The content distribution by the representative is an example in which the capture shooting process is performed according to the representative's operation. The automatic distribution by the content management server 6 is an example in which the capture shooting process is performed according to image change detection performed by the content management server 6. The content acquisition by the content management server 6 is an example in which a capture shooting process is performed by the content management server 6. The content acquisition by the personal board do (personal terminal 2) is an example in which the capture shooting process is performed by the personal terminal 2.

Pattern A is an example in which the content distribution by the presenter and the content acquisition by the content management server 6 are executed. In the pattern A, the content management server 6 performs the capture shooting process according to the presenter's operation, and the personal terminal 2b and the personal terminal 2c acquire the capture image from the content management server 6.

Pattern B is an example in which the automatic distribution by the content management server 6 and content acquisition by the content management server 6 are executed. In the pattern B, the capture shooting process is performed by the content management server 6 in response to the image change detection performed by the content management server 6, and the personal terminal 2b and the personal terminal 2c acquire the capture image from the content management server 6.

Pattern C is an example in which the content distribution by the presenter and the content acquisition by the personal board de (personal terminal 2) are executed. The pattern C is an example in which the personal terminal 2 performs the capture shooting process according to the operation by the presenter.

Pattern D is an example in which the automatic distribution by the content management server 6 and the content acquisition by the personal board d (personal terminal 2) are executed. In the pattern D, the capture shooting process is performed by the personal terminal 2 in response to the image change detection performed by the content management server 6.

Pattern E is an example in which the content distribution by the representative and the content acquisition by the content management server 6 are executed. In the pattern E, the content management server 6 performs the capture shooting process according to the representative's operation, and the personal terminal 2b and the personal terminal 2c acquire the capture image from the content management server 6. In another example of the pattern E, as in the similar or substantially the similar manner to the patterns C and D, the capture shooting process may be performed in each of the personal terminal 2b and the personal terminal 2c. Alternatively, the capture shooting process may be performed by the personal terminal 2d, and the capture image may be transmitted to the personal terminal 2b and the personal terminal 2c via the content management server 6.

In the patterns A and B, displaying the shared screen ss on the personal terminal 2b and the personal terminal 2c of the attendees is optional. In the patterns A and B, in a case where the shared screen ss is not displayed on the personal terminal 2*b* and the personal terminal 2*c* of the attendee B and the attendee C, the shared screen does not have to be transmitted from the content management server 6 to the personal terminal 2*b* and the personal terminal 2*c*. In a user interface (UI) displayed on the personal terminal 2*a* and the personal terminal 2*c*, at least a capture image is displayed as an UI illustrated in FIG. 14.

In still another example, in the patterns C and D, instead of causing the personal terminal 2*b* and the personal terminal 2*c* to perform the capture shooting processing, the capture shooting processing may performed by the personal terminal 2*a* and the capture image may be transmitted to the personal terminal 2*b* and the personal terminal 2*c* via the content management server 6.

Figure 14:
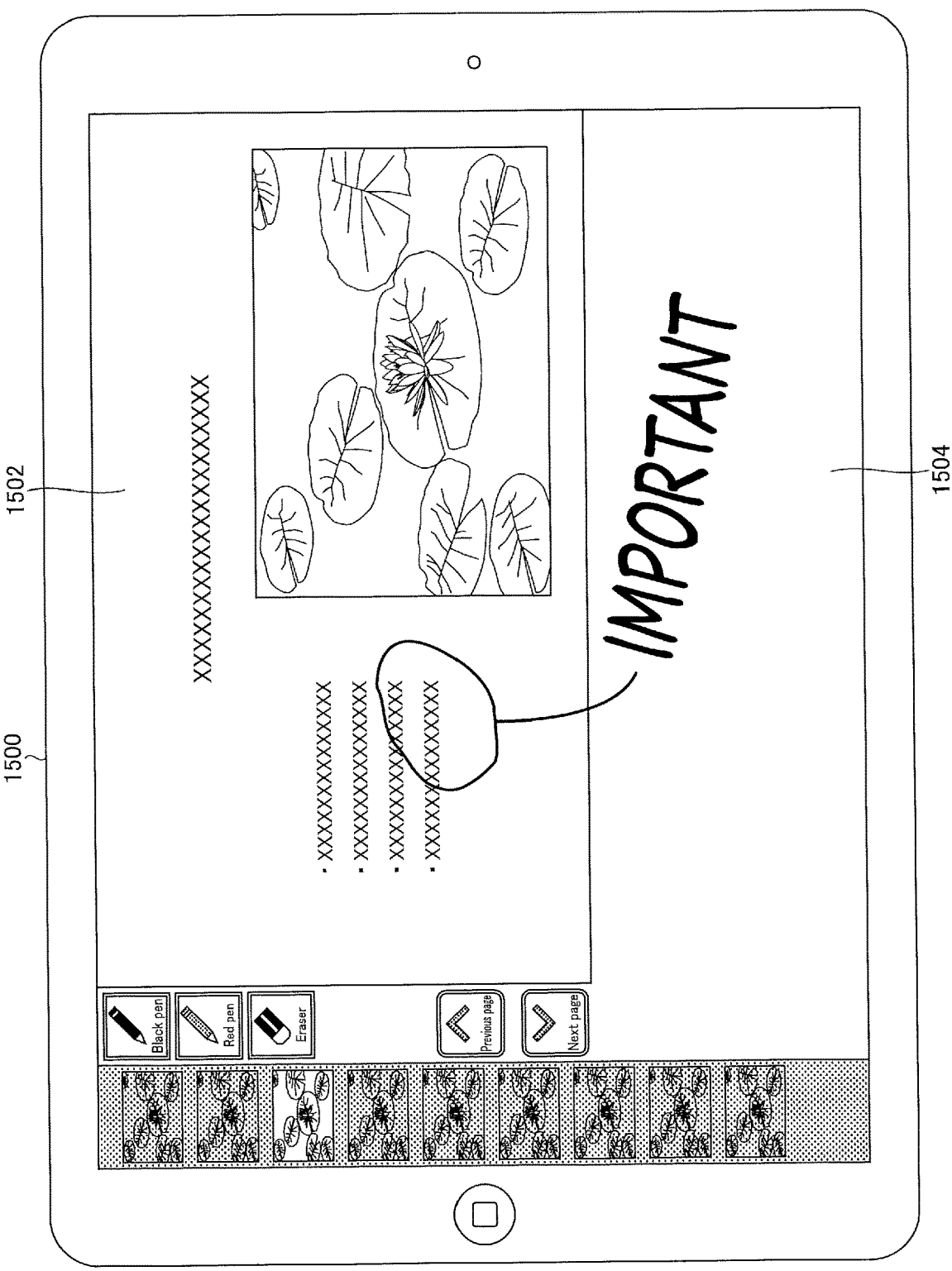
FIG. 14 is an illustration of an example of a user interface (UI) of the information sharing system, according to an embodiment of the present disclosure.

FIG. 14 is an illustration of an example of a UI of the information sharing system, according to the present embodiment. A UI 1500 illustrated in FIG. 14 has a page selection area, an operation selection area, a content display area 1502, and a margin area 1504.

In the page selection area, which is provided on the leftmost of the UI 1500, thumbnails of capture images are displayed as pages. By selecting (touching) a desired thumbnail of the thumbnails, an operation of jumping to the capture image corresponding to selected thumbnail is accepted. In the operation selection area, which is provided between the page selection area and the content display area 1502, buttons that accepts an operations to select a black pen, a red pen, and an eraser used for a handwritten memo, and buttons that accept operations to move to a previous page or a next page are displayed.

In the content display area 1502, a capture image is displayed. In the margin area 1504, various memos can be recorded. The handwritten memo such as handwriting text or object arrangement can be written in both the content display area 1502 and the margin area 1504.

Figure 10:
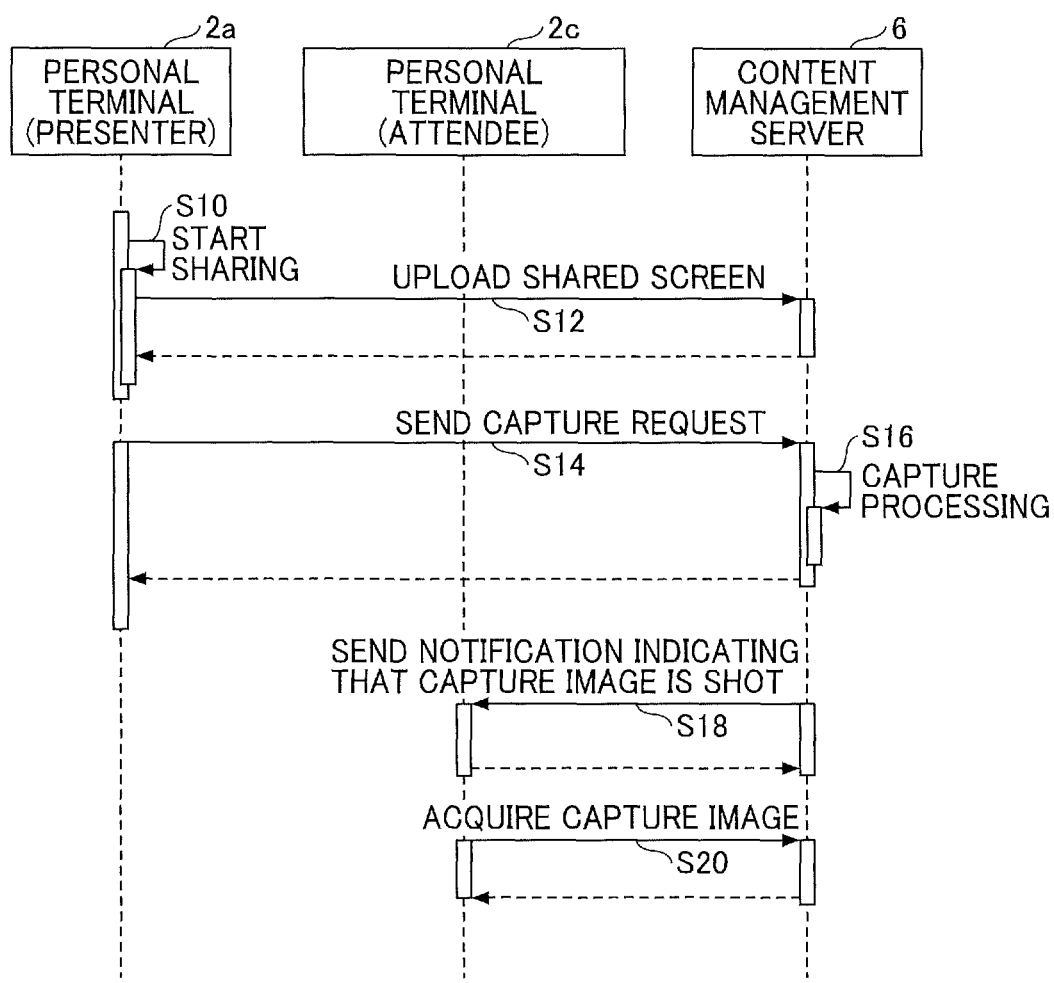
FIG. 10 is a sequence diagram illustrating an example of an operation performed by the information processing system, according to an embodiment of the present disclosure.

Pattern A:

In the pattern A, for example, a capture image is generated by the procedure illustrated in FIG. 10, and the generated capture image is displayed on the UI of the personal terminal 2*c*. FIG. 10 is a sequence diagram illustrating an example of an operation performed by the information processing system, according to the present embodiment. The personal terminal 2*b* is omitted in FIG. 10, in order to simplify the drawings.

In step S10, the information sharing system prepares for a meeting. In the meeting preparation, preparation of a room is performed in response to a request from the personal terminal 2*a* operated by the presenter, and connection to the room from the personal terminal 2*b* and the personal terminal 2*c* is performed. The user A, the user B, and the user C of the personal terminal 2*a*, the personal terminal 2*b*, and the personal terminal 2*c*, who are connected to the room are registered in the structure (C) of FIG. 8, and conduct the meeting. The personal terminal 2*a* accepts an operation of selecting a target to be streamed to the shared screen ss. This operation is an example of an operation of starting sharing from the presenter.

For example, the operation of selecting the target to streamed to the shared screen ss is to select an entire screen of the personal terminal 2*a*. In another example, the operation of selecting the target to streamed to the shared screen ss is to select a window of a particular application, or to select a tab of the web browser.

In step S12, the personal terminal 2*a* uploads data of the content selected to be streamed to the shared screen ss of the content management server 6 by streaming. After the process of step S12, the personal terminal 2*a* continues to stream the data of the content selected as the streaming transmission target to the shared screen ss of the content management server 6.

Figure 15:
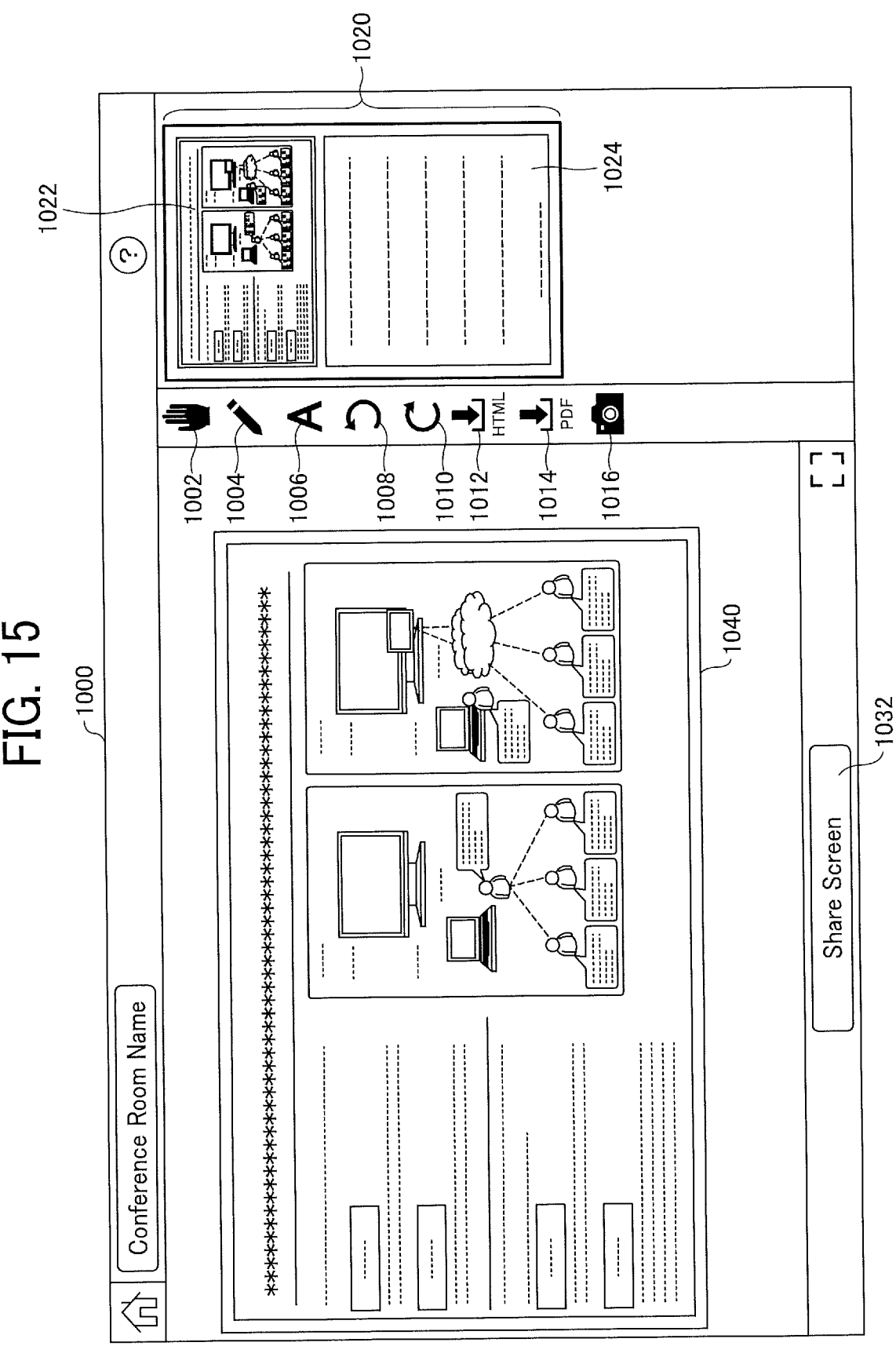
FIG. 15 is an illustration of an example of a UI of the information sharing system, according to an embodiment of the present disclosure.

The personal terminal 2*a* of the presenter displays, for example, a UI 1000 illustrated in FIG. 15. FIG. 15 is an illustration of an example of the UI of the information sharing system, according to the present embodiment. In the UI 1000 of FIG. 15, a projection area of a shared screen 1040 is displayed on the left side. Further, in the UI 1000 of FIG. 15, a set of a capture image 1022 of the shared screen 1040 and a text memo area 1024 accompanied with the capture image 1022 is displayed on a sheet 1020 on the right side.

Furthermore, in the UI 1000 of FIG. 15, a tool pallet is displayed, in which a hand tool button 1002, a pen tool button 1004, a text tool button 1006, an undo button 1008, a redo button 1010, an HTML save button 1012, a PDF save button 1014, and a capture button 1016 are displayed. Still further, a "Share Screen" button 1032, which, when selected, causes the current screen to transition to a screen for selecting a target to be streamed to the shared screen ss is displayed.

The hand tool button 1002 is a button, which, when selected, allows a user to start using a hand tool. The pen tool button 1004 is a button, which, when selected, allows a user to start using a pen tool. The text tool button 1006 is a button, which, when selected, allows a user to start using a text tool. The undo button 1008 is a button for undoing actions previously done. The redo button 1010 is a button for redoing actions that have undone with the undo button 1008.

The HTML save button 1012 is a button for locally saving information of the UI 1000 as an HTML file. The PDF save button 1014 is a button for locally saving information of the UI 1000 as a PDF file.

The presenter performs an operation of pressing the capture button 1016, to instruct the personal terminal 2*a* to send a capture request for capturing the shared screen 1040 displayed in the projection area. While viewing the shared screen 1040 displayed on the UI 1000, the presenter performs an operation of pressing the capture button 1016 at the timing at which the presenter wants to take a capture image. In response to receiving the operation of pressing the capture button 1016, the presenter's personal terminal 2*a* transmits a capture shooting request to the content management server 6 in step S14.

In response to receiving the capture shooting request, in steps S16, the content management server 6 shoots a capture image of the shared screen SS of the current time. The content management server 6 searches the structure (C) of FIG. 8 to identify a particular room ID associated with the user ID of the presenter operating the personal terminal 2*a* from which the capture shooting request is received in step S14. Further, the content management server 6 searches the structure (C) of FIG. 8 to identify the user IDs associated with the identified particular room ID, other than the user ID of the presenter, as the user IDs of the attendees. The content management server 6 registers information on the capture image captured in step S16 in the structures (A) and (B) of FIG. 8 in association with the identified room ID, presenter, and attendees.

The operation proceeds to step S18, and the content management server 6 transmits a notification indicating that the capture image is shot to the personal terminal 2*b* of the attendee B and the personal terminal 2*c* of the attendee C associated with the same room ID of the presenter. The operation proceeds to step S20, and each of the personal terminal 2*b* and the personal terminal 2*c* transmits, to the content management server 6, a request for acquiring the capture image of the shared screen ss based on the notification received in step S18. The content management server 6 causes the personal terminal 2b of the attendee B and the personal terminal 2c of the attendee C to acquire the capture image of the shared screen ss according to the content management DB 6003 of FIG. 8.

As described heretofore, in the pattern A, the capture image of the shared screen ss is captured in response to the capture shooting request from the presenter, and the personal terminal 2 of the attendee acquires the capture image. Thus, the presenter can have the attendee sequentially acquire the presentation materials and the like as the meeting progresses. Further, the presenter can select his/her desired capture image(s) to be acquired by the attendee. On the other hand, the attendee does not need to perform the operation for capture shooting, and can concentrate on the meeting.

Figure 11:
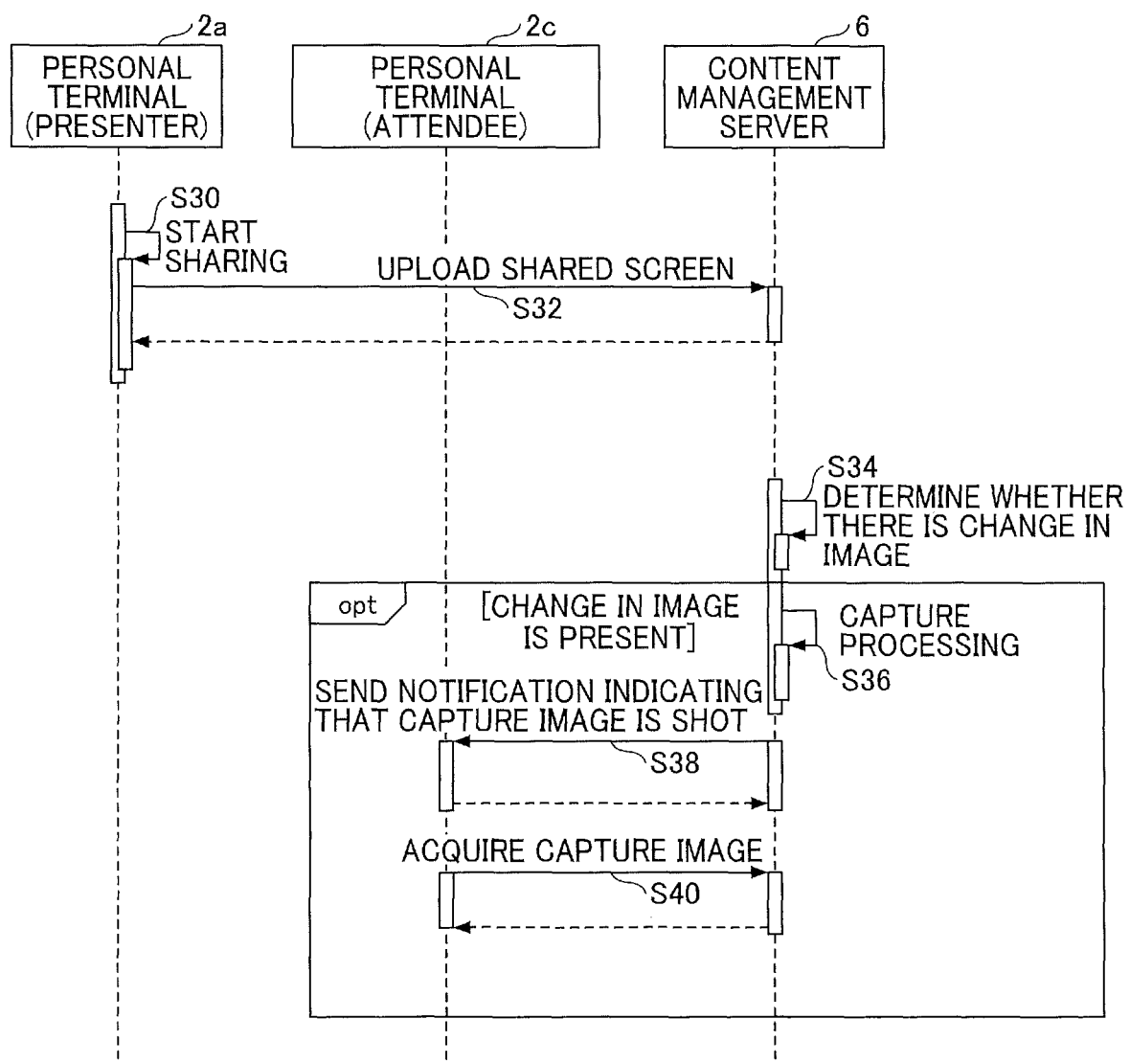
FIG. 11 is a sequence diagram illustrating an example of an operation performed by the information processing system, according to an embodiment of the present disclosure.

Pattern B:

In the pattern B, for example, a capture image is generated by the procedure illustrated in FIG. 11, and the generated capture image is displayed on the UI of the personal terminal 2c. FIG. 11 is a sequence diagram illustrating an example of an operation performed by the information processing system, according to the present embodiment. The personal terminal 2b is omitted in FIG. 11, in order to simplify the drawings.

In step S30, the information sharing system accepts a sharing start operation from the presenter in the same or substantially the same manner as step S10 of FIG. 10. In step S32, the personal terminal 2a uploads data of the content selected to be streamed to the shared screen ss of the content management server 6 by streaming. After the process of step S32, the personal terminal 2a continues to stream the data of the content selected as the streaming transmission target to the shared screen ss of the content management server 6.

The operation proceeds to step S34, and the content management server 6 performs an image change detection process. In the image change detection process of step S34, the content management server 6 determines whether the amount of change in the image of the shared screen ss is equal to or greater than a threshold value (for example, the amount of change of the image is 80% or more). When the amount of change in the image of the shared screen ss is equal to or greater than the threshold value, the content management server 6 determines that there is a change in the image, and performs the processes of steps S36 to S40. When the amount of change in the image of the shared screen ss is less than the threshold value, the content management server 6 determines that the image has not changed and does not perform the processes of steps S36 to S40.

Based on the determination that there is a change in the image, the content management server 6 shoots a capture image of the shared screen SS of the current time in step S36. The content management server 6 searches the structure (C) of FIG. 8 to identify a particular room ID associated with the user ID of the presenter operating the personal terminal 2a from which the content data is uploaded in step S32. Further, the content management server 6 searches the structure (C) of FIG. 8 to identify the user IDs associated with the identified particular room ID, other than the user ID of the presenter, as the user IDs of the attendees. The content management server 6 registers information on the capture image captured in step S36 in the structures (A) and (B) of FIG. 8 in association with the identified room ID, presenter, and attendees.

The operation proceeds to step S38, and the content management server 6 transmits a notification indicating that the capture image is shot to the personal terminal 2b of the attendee B and the personal terminal 2c of the attendee C associated with the same room ID of the presenter. The operation proceeds to step S40, and each of the personal terminal 2b and the personal terminal 2c transmits, to the content management server 6, a request for acquiring the capture image of the shared screen ss based on the notification received in step S38. The content management server 6 causes the personal terminal 2b of the attendee B and the personal terminal 2c of the attendee C to acquire the capture image of the shared screen ss according to the content management DB 6003 of FIG. 8.

Although the description given above is of an example case in which, in the image change detection process of step S34, the occurrence of a trigger for capturing the capture image of the shared screen ss is determined based on the amount of change in the image of the shared screen ss, the embodiment is not limited to this example. In another example, the image change detection process may be performed based on the lapse of a fixed time (e.g., at regular intervals). In still another example, page numbers (page identification information) are inserted in the four corners of the image of the shared screen ss. In this example, in the image change detection process of S34, the occurrence of a trigger for capturing the capture image of the shared screen ss may be detected based on the change in the page number read from the page numbers.

As described heretofore, in the pattern B, the occurrence of the trigger for capturing the capture image of the shared screen ss is determined based on the amount of change in the image of the shared screen ss, the capture image of the shared screen ss is captured, and the personal terminal 2 of the attendee acquires the capture image.

Thus, the presenter can have the attendee(s) sequentially acquire the presentation materials and the like as the meeting progresses. Further, the presenter can select his/her desired capture image(s) to be acquired by the attendee. On the other hand, the attendee does not need to perform the operation for capture shooting, and can concentrate on the meeting.

Figure 12:
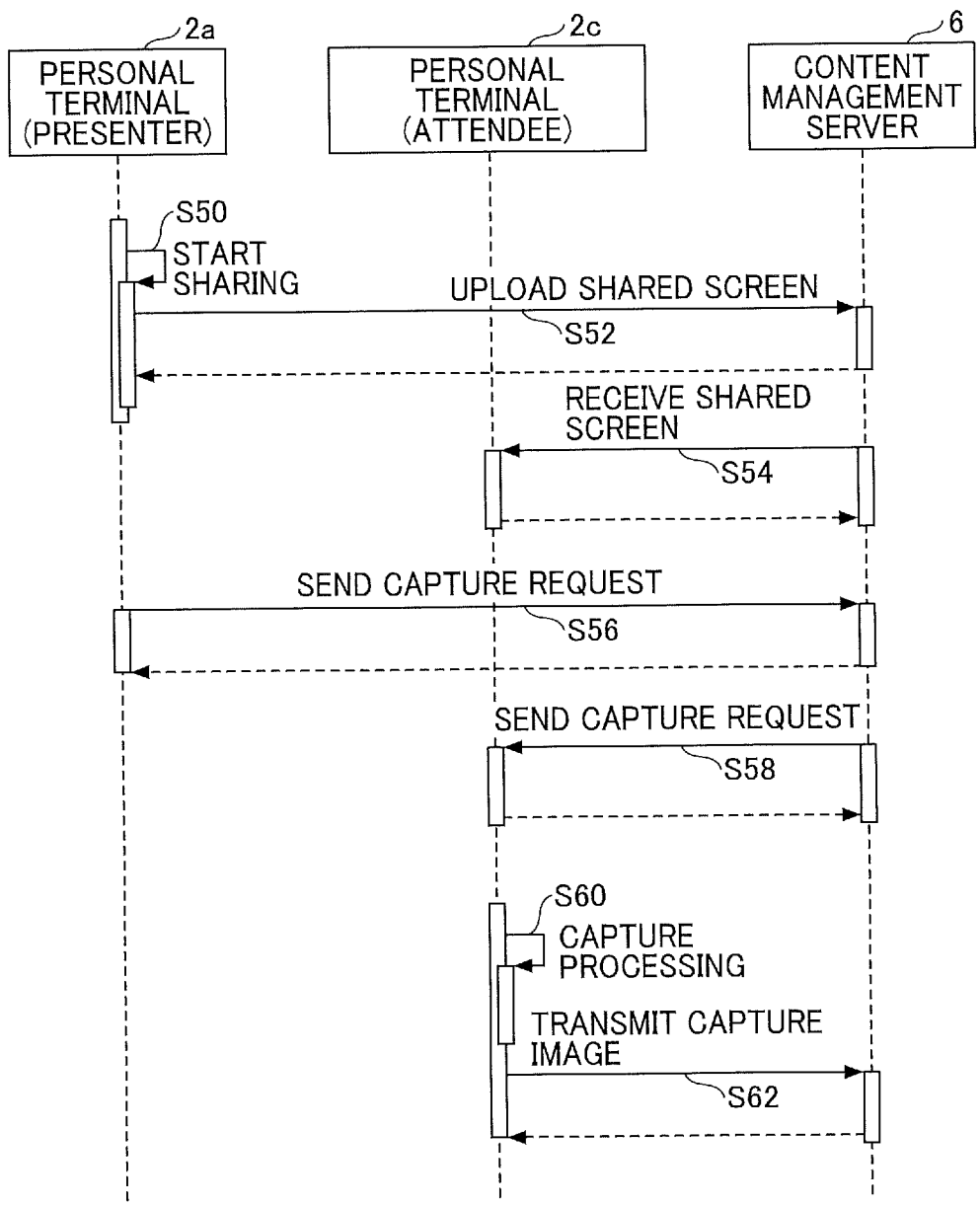
FIG. 12 is a sequence diagram illustrating an example of an operation performed by the information processing system, according to an embodiment of the present disclosure.

Pattern C:

In the pattern C, for example, a capture image is generated by the procedure illustrated in FIG. 12, and the generated capture image is displayed on the UI of the personal terminal 2c. FIG. 12 is a sequence diagram illustrating an example of an operation performed by the information processing system, according to the present embodiment. The personal terminal 2b is omitted in FIG. 12, in order to simplify the drawings.

In step S50, the information sharing system accepts a sharing start operation from the presenter in the same or substantially the same manner as step S10 of FIG. 10. In step S52, the personal terminal 2a uploads data of the content selected to be streamed to the shared screen ss of the content management server 6 by streaming. After the process of step S52, the personal terminal 2a continues to stream the data of the content selected as the streaming transmission target to the shared screen ss of the content management server 6.

The operation proceeds to step S54, and the content management server 6 transmits the content data uploaded by streaming to the shared screen ss, to the personal terminal 2b and the personal terminal 2c of the attendees who are identified as participating in the same room in which the presenter is participating based on the structure (C) of FIG. 8. Thus, the personal terminal 2b and the personal terminal 2c of the attendees participating in the room receive the image of the shared screen ss.

The presenter's personal terminal 2a displays, for example, the UI 1000 of FIG. 15 described above. The presenter presses the capture button 1016, to instruct the personal terminal 2a to shoot a capture image of the shared screen 1040 displayed in the projection area. While viewing the shared screen 1040 displayed on the UI 1000, the presenter performs an operation of pressing the capture button 1016 at the timing at which the presenter wants to take a capture image. In response to receiving the operation of pressing the capture button 1016, the presenter's personal terminal 2a transmits a capture shooting request to the content management server 6 in step S56.

In step S58, the content management server 6 transmits the capture shooting request received from the personal terminal 2a of the presenter, to the personal terminal 2b and the personal terminal 2c of the attendees who are identified as participating in the same room in which the presenter is participating based on the structure (C) of FIG. 8.

In response to receiving the capture shooting request, in steps S60, each of the personal terminal 2b and the personal terminal 2c shoots a capture image of the shared screen SS of the current time. The operation proceeds to step S62, and each of the personal terminal 2b and the personal terminal 2c displays the capture image taken in step S60, as the UI 1500 illustrated in FIG. 14, for example. Further, each of the personal terminal 2b and the personal terminal 2c transmits the capture image taken in step S60 to the content management server 6.

Further, the content management server 6 registers information of the received capture image in the structures (A) and (B) of FIG. 8. As the content management server 6 registers information of the received capture image in the structures (A) and (B) of FIG. 8, the content management server supports reloading of the UI 1500 and transmission of the capture image to the personal terminal 2 of an attendee who participate in the meeting after the meeting has started.

Figure 13:
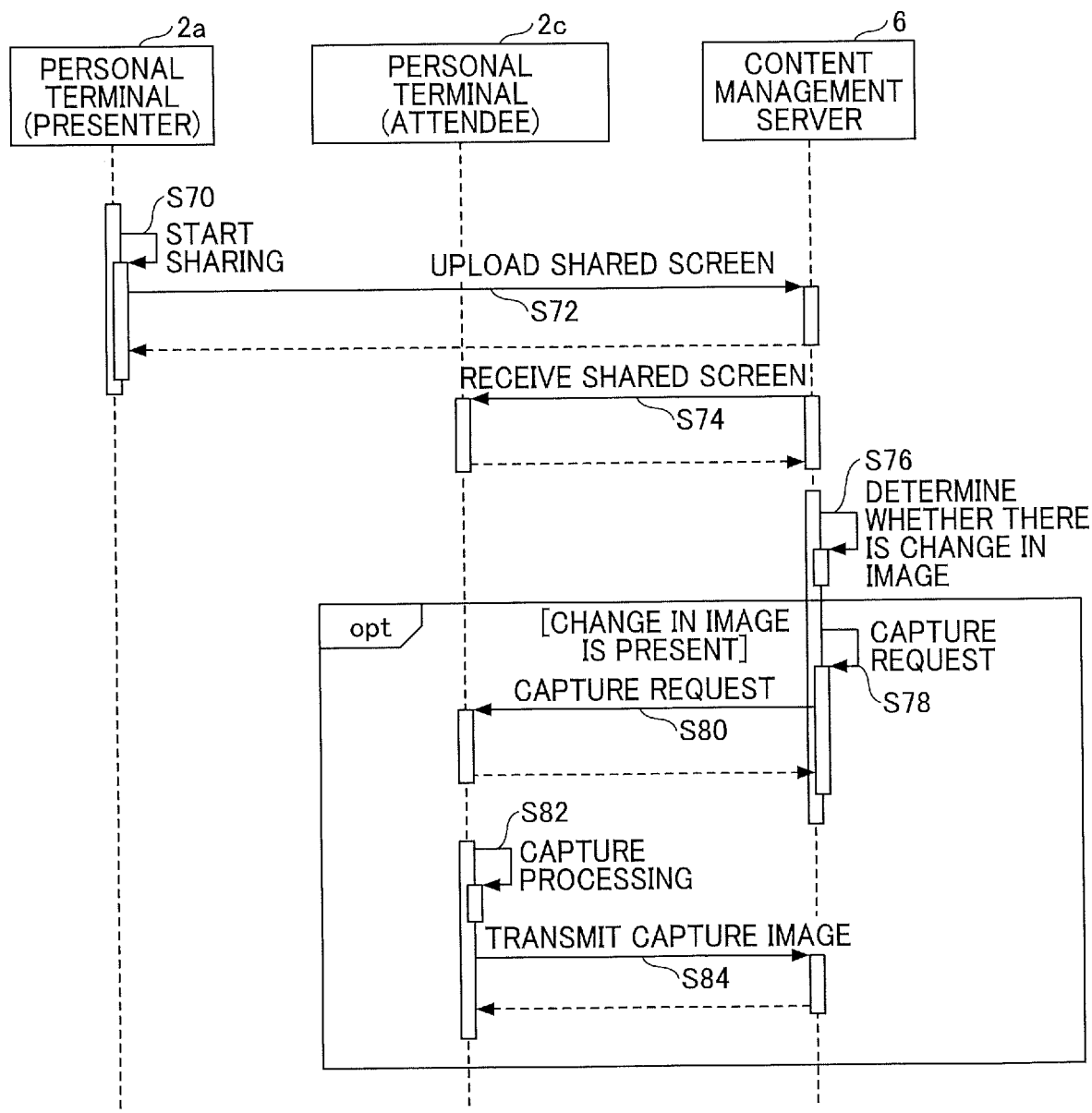
FIG. 13 is a sequence diagram illustrating an example of an operation performed by the information processing system, according to an embodiment of the present disclosure.

Pattern D:

In the pattern D, for example, a capture image is generated by the procedure illustrated in FIG. 13, and the generated capture image is displayed on the UI of the personal terminal 2c. FIG. 13 is a sequence diagram illustrating an example of an operation performed by the information processing system, according to the present embodiment. The personal terminal 2b is omitted in FIG. 13, in order to simplify the drawings.

In step S70, the information sharing system accepts a sharing start operation from the presenter in the same or substantially the same manner as step S10 of FIG. 10. In step S72, the personal terminal 2a uploads data of the content selected to be streamed to the shared screen ss of the content management server 6 by streaming. After the process of step S72, the personal terminal 2a continues to stream the data of the content selected as the streaming transmission target to the shared screen ss of the content management server 6.

The operation proceeds to step S74, and the content management server 6 transmits the content data uploaded by streaming to the shared screen ss, to the personal terminal 2b and the personal terminal 2c of the attendees who are identified as participating in the same room in which the presenter is participating based on the structure (C) of FIG. 8. Thus, the personal terminal 2b and the personal terminal 2c of the attendees participating in the room receive the image of the shared screen ss.

The operation proceeds to step S76, and the content management server 6 performs the image change detection process in the similar or substantially similar way to step S34 of FIG. 11. When the amount of change in the image of the shared screen ss is equal to or greater than the threshold value, the content management server 6 determines that there is a change in the image, and performs the processes of steps S78 to S84. When the amount of change in the image of the shared screen ss is less than the threshold value, the content management server 6 determines that the image has not changed and does not perform the processes of steps S78 to S84.

In the process of steps S78 to S80, based on the determination that there is a change in the image, the content management server 6 transmits a capture shooting request for having the terminals to shoot a capture image of the shared screen ss, to the personal terminal 2b and the personal terminal 2c of the attendees who are identified as participating in the same room in which the presenter is participating based on the structure (C) of FIG. 8.

In response to receiving the capture shooting request, in steps S82, each of the personal terminal 2b and the personal terminal 2c shoots a capture image of the shared screen SS of the current time. The operation proceeds to step S84, and each of the personal terminal 2b and the personal terminal 2c displays the capture image taken in step S82, as the UI 1500 illustrated in FIG. 14, for example. Further, each of the personal terminal 2b and the personal terminal 2c transmits the capture image taken in step S82 to the content management server 6.

Further, the content management server 6 registers information of the received capture image in the structures (A) and (B) of FIG. 8. As the content management server 6 registers information of the received capture image in the structures (A) and (B) of FIG. 8, the content management server supports reloading of the UI 1500 and transmission of the capture image to the personal terminal 2 of an attendee who participate in the meeting after the meeting has started.

The pattern E is different from the pattern A in that the capture shooting request in step S14 in FIG. 10 is transmitted from the personal terminal 2d of the representative, instead of from the personal terminal 2a of the presenter. Further, the information sharing system according to the present embodiment may support a function of transmitting a capture deletion request to the personal terminal(s) 2 of the attendee(s) who are participating in the room when the presenter or the representative performs an operation of deleting a capture image, to have the personal terminal(s) 2 to delete the capture image.

The information sharing system according to the present embodiment has the personal terminal 2 or the personal terminals 2 of the attendee(s) to acquire a capture image intended by the presenter or the representative at the intended timing. Thus, the information sharing system according to the present embodiment has the attendee(s) sequentially acquire presentation materials and the like as the meeting progresses. Further, the information processing system according to the present embodiment saves the attendee(s) from having to perform an operation for acquiring a captured image. Thus, the attendees can concentrate on listening to explanations and taking notes, whereby reducing the time and efforts to acquire a capture image is reduced.

Second Embodiment

In the first embodiment, for example, the schedule link unit 62 acquires, from the schedule management server 8, the schedule information including the reference information of a meeting in which a user participates, whereby the preparation of the meeting including the process of step S10 in FIG. 10 is performed. In the meeting preparation, preparation of a room is performed in response to a request from the personal terminal 2a operated by the presenter, and connection to the room from the personal terminal 2b and the personal terminal 2c is performed.

In the second embodiment, a keyword including a base keyword associated with a user who prepares a room is created, and the keyword is stored in association with the room. A user who wants to participate in the room enters the keyword or a uniform resource locator (URL) including the keyword at the personal terminal 2, to acquire access information that enables the user to participate in (connect to) the room, whereby making it easy to deal with a sudden meeting, for example. A description of elements, members, components, and operations that are the same as those in the first embodiment is omitted below as appropriate.

Figure 18:
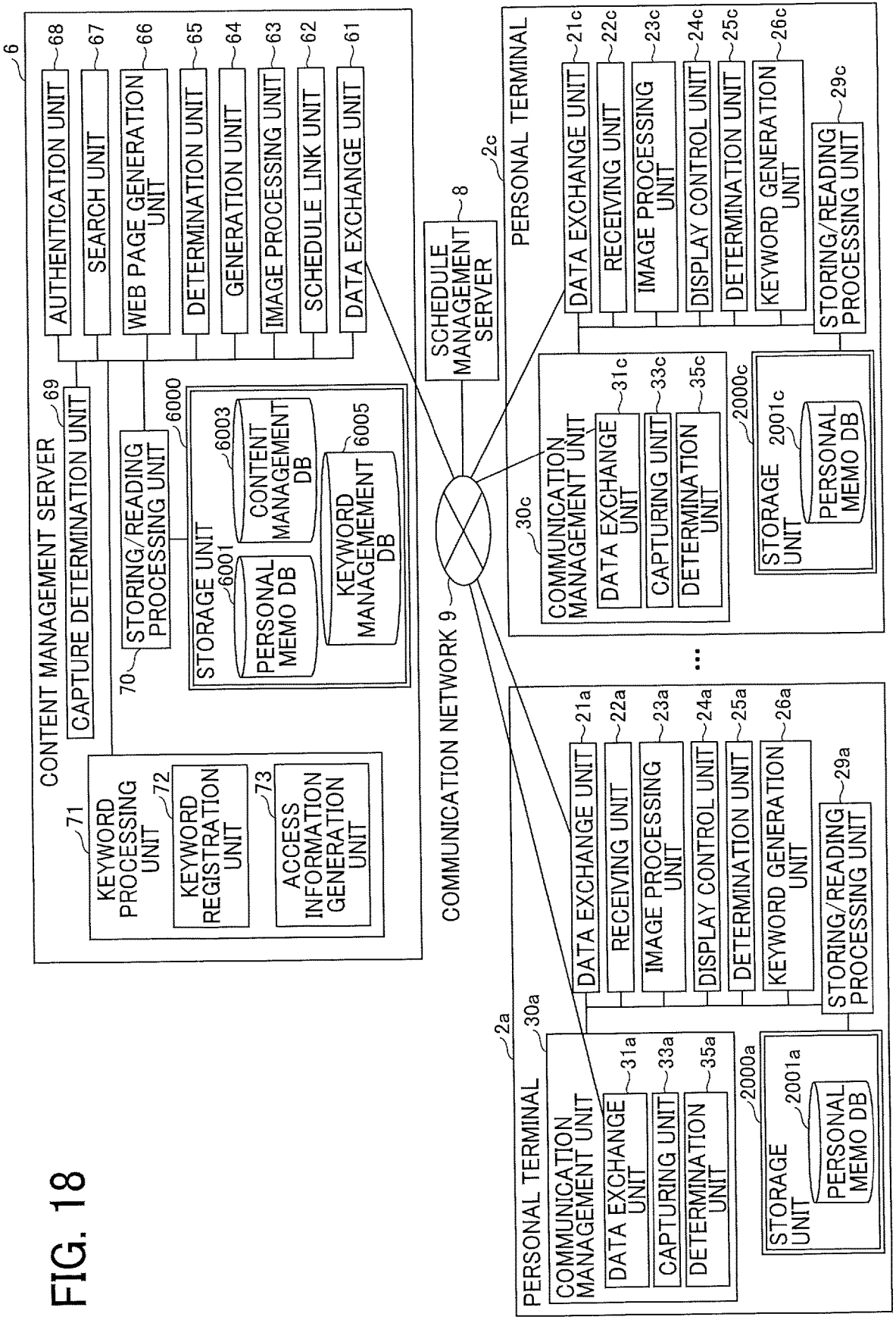
FIG. 18 is a block diagram illustrating another example of a functional configuration of the personal terminal and the content management server of the information sharing system, according to an embodiment of the present disclosure.

FIG. 18 is a block diagram illustrating another example of a functional configuration of the personal terminal 2 and the content management server 6 of the information sharing system. In the functional block diagram of FIG. 18, compared with the functional block diagram of FIG. 7, the content management server 6 further includes a keyword processing unit 71 and a keyword management DB 6005, and the personal terminal 2 further includes a keyword generation unit 26.

The keyword processing unit 71 and the keyword generation unit 26 are functions or means implemented by or caused to function by operating one or more hardware components illustrated in FIG. 3 in cooperation with instructions of the CPU 501 according to the program loaded from the HD 504 to the RAM 503.

The keyword generation unit 26 generates a keyword including a base keyword. The keyword generation unit 26 makes a keyword registration request for registering the generated keyword in the content management server 6.

The keyword processing unit 71 has a keyword registration unit 72 and an access information generation unit 73. The keyword processing unit 71 is responsible for keyword registration and personal memo URL generation from the keyword. The keyword registration unit 72 is responsible for keyword registration. The access information generation unit 73 is responsible for personal memo URL generation from the keyword.

The keyword registration unit 72 generates a room in response to a keyword registration request from the personal terminal 2a, associates the room with the keyword, and stores and manages the association result in the keyword management DB 6005.

The access information generation unit 73 generates the personal memo URL of the room associated with the keyword from the personal terminal 2b, for example, of the attendee. The personal memo URL is an example of access information that allows the attendee to participate in the room (display the personal memo dm) from the personal terminal 2b, etc. The access information generation unit 73 transmits the generated personal memo URL to the personal terminal 2b, etc., of the attendee.

This enables the attendee of the personal terminal 2b, etc., to enter the keyword in a keyword input screen described below or enter the URL including the keyword into the web browser, to open the URL of the personal memo dm of the room associated with the keyword.

FIG. 19 is an illustration of an example of data structure of the keyword management DB 6005. The storage unit 6000 of the content management server 6 includes the keyword management DB 6005 as illustrated in FIG. 19. The keyword management DB 6005 of FIG. 19 is configured by a combination of structures (A) and (B). The structure (A) associates, for each user ID as a main key, the user ID with a base keyword. The structure (B) associates, for each keyword as a main key, the keyword with a room (meeting) ID.

Each user who uses the information sharing system according to the present embodiment is associated with a base keyword as illustrated in the structure (A). The base keyword is used to generate the keyword of the structure (B). For example, when a user whose user ID in the structure (A) of FIG. 19 is "user-a" creates a room, a keyword "abc_20190101_1200" including the base keyword "abc" is generated. The generated keyword "abc_20190101_1200" is stored in association with the room (meeting) ID "room-a", as in the structure (B) of FIG. 19. The keyword of the structure (B) is used by a user who participates in the room from the personal terminal 2 to acquire the personal memo URL.

Figure 20:
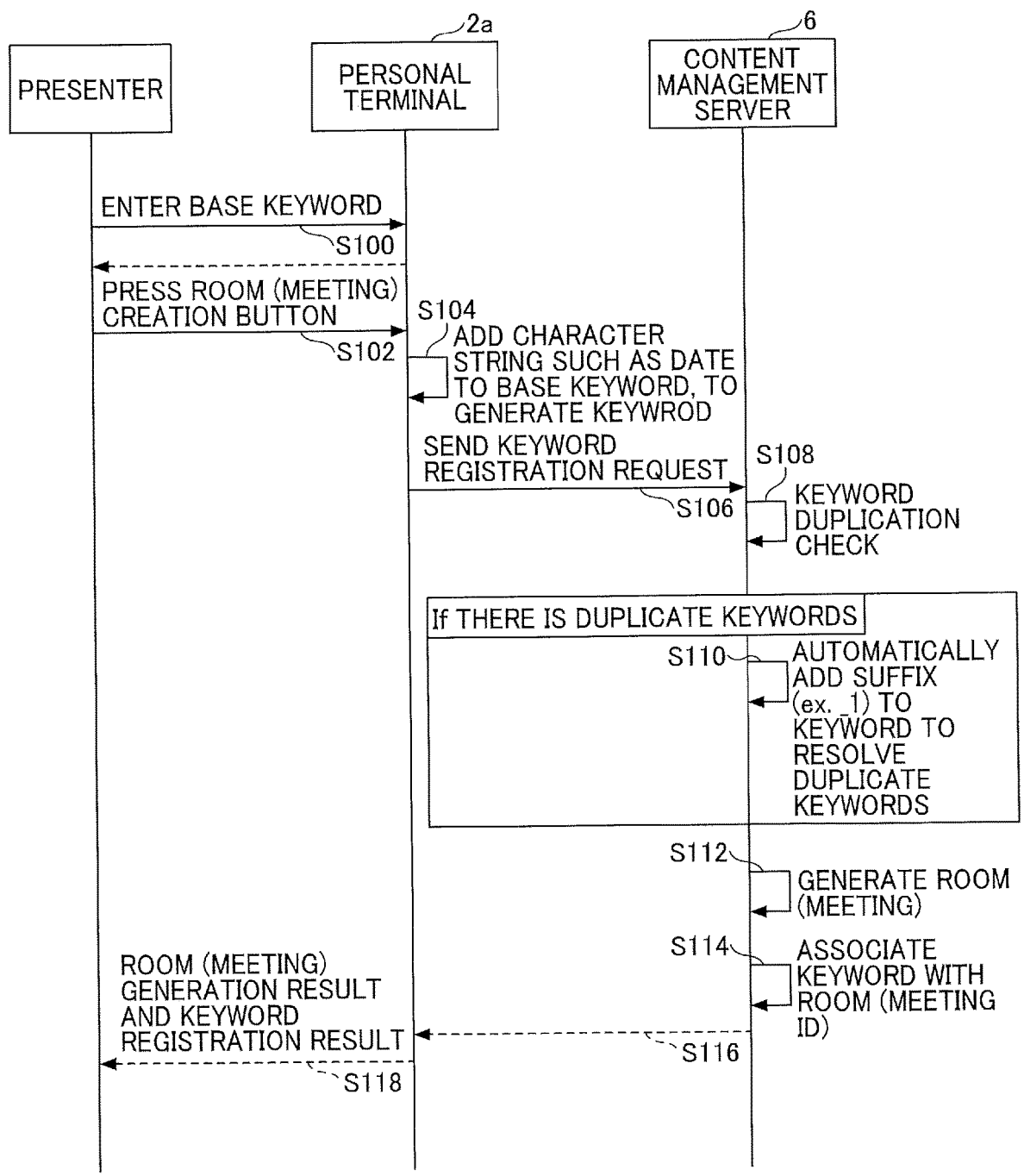
FIG. 20 is a sequence diagram illustrating an example of steps in an operation of room creation and keyword registration performed by the information sharing system, according to an embodiment of the present disclosure.

FIG. 20 is a sequence diagram illustrating an example of steps in an operation of room creation and keyword registration performed by the information sharing system, according to the present embodiment. Although in FIG. 20, an example in which the presenter creates a room, the embodiment is not limited thereto. In another example, a person other than the presenter, such as the representative or an organizer may create a room.

In step S100, the presenter enters a base keyword (e.g., "abc") on a UI displayed on the personal terminal 2a, the UI being distributed from the content management server 6. In one example, the base keyword input each time. Alternatively, a value determined in advance (for example, registered at the time of user registration) may be used.

FIG. 21 is an illustration of an example of a UI 2000 that allows a user to register the base keyword concurrently with user registration. The UI 2000 of FIG. 21 accepts registration of a base keyword as one of information items that need to be registered in order to use the information sharing system. The base keyword and the user ID registered on the UI 2000 of FIG. 21 are stored in association with each other in the table of the structure (A) of FIG. 19. The base keyword registered as a new record in the table of the structure (A) of FIG. 19 at the time of user registration may be changed after the user registration.

The base keyword is used, since a user is likely to recognize or visually recognize a keyword generated to include the base keyword, and the duplication rate is likely to be low, compared with keywords generated from dates or random character strings.

Referring again to FIG. 20, in step S102, the presenter presses a room (meeting) creation button on a UI on the personal terminal 2a distributed from the content management server 6. The UI including the room (meeting) creation button is one example, and the embodiment is not limited thereto. Any suitable UI can be used, provided that it accepts the room (meeting) creation request from the user.

In step S104, the keyword generation unit 26a of the personal terminal 2a generates a keyword including the base keyword. The keyword generation unit 26a attaches a character string such as a date to the base keyword, to create the keyword such as "abc_20190101_1200". The keyword may be in the format of {personal name}_{serial number}, {company name}+{serial number}, or the like, instead of {base keyword}_{date}_{time}. In another example, the keyword may be at least one of a meeting name, a seminar name, a building name, a conference room name, etc. that is attached to base keyword.

For example, the keyword generation unit 26a reads out the base keyword "abc" associated with the presenter's user ID "user-a" from the keyword management DB 6005 of the content management server 6. Then, the keyword generation unit 26a assigns the current date and time "20190101" "1200" to the base keyword "abc" to generate the keyword "abc_20190101_1200". The process of generating the keyword in step S104 may be performed by the content management server 6.

In step S106, the keyword generation unit 26a of the personal terminal 2a transmits, to the content management server 6, a keyword registration request for registering the keyword generated in step S104 in the content management server 6. In response to receiving the keyword registration request, the keyword registration unit 72 of the content management server 6 performs a keyword duplication check in step S108. The keyword duplication check of step S108 is a process of referring to the keyword management DB 6005 to check whether there is no duplication of the designated keyword.

When there is no duplication of the designated keyword, the content management server 6 generates a room (meeting) in step S112. The operation proceeds to step S114, and the keyword registration unit 72 stores the room (meeting) ID of the room generated in step S112 with the keyword designated from the personal terminal 2a in association with each other in the table of the structure (B) of the keyword management DB 6005.

The operation proceeds to step S116, and the content management server 6 transmits a notification indicating the room (meeting) generation result and the keyword registration result to the personal terminal 2a. The operation proceeds to step S118, and the personal terminal 2a displays the room (meeting) generation result and the keyword registration result on a UI as illustrated in FIG. 22, for example.

FIG. 22 is an illustration of an example of a UI 2100 that displays the room (meeting) generation result and the keyword registration result. The UI 2100 illustrated in FIG. 22 displays the keyword, which is associated with the room (meeting) ID at the content management server 6, the URL including the keyword, and a two-dimensional code such as a QR code (registered trademark) obtained by coding the URL including the keyword.

Meeting participants such as the presenter and the attendees use the keyword, the URL, and the two-dimensional code displayed in FIG. 22 to obtain access information for participating in the room (displaying the personal memo dm) as described below. The keyword, the URL, and the two-dimensional code displayed in FIG. 22 are distributed to the participants in various manner such as email, chat, and projection on a projector. For example, in a case in which the keyword, the URL, and the two-dimensional code are emailed to the participants, a mail format including "the URL and a Jump to Link Destination message" or "the two-dimensional code and Read Two-dimensional Code message" is used.

Referring again to FIG. 20, when there is duplication of the designated keyword in step S108, the keyword registration unit 72 of the content management server 6 may automatically add a suffix such as "_1" so that there are no duplicate keywords in S110. For example, one of the duplicate keywords "abc_20190101_1200" is changed to the keyword "abc_20190101_1200_1". The processes performed after the keyword is changed so that there are no duplicate keywords are the same or the substantially the same as the process performed when there is no duplication of the designated keyword, and thus the redundant description thereof is omitted below.

In another example, when there is duplication of the designated keyword in step S108 of FIG. 20, the keyword registration unit 72 returns "NG" to the personal terminal 2a as the room (meeting) generation result. In this case, the operation returns to step S100 to allow the presenter to try a different password.

Figure 23:
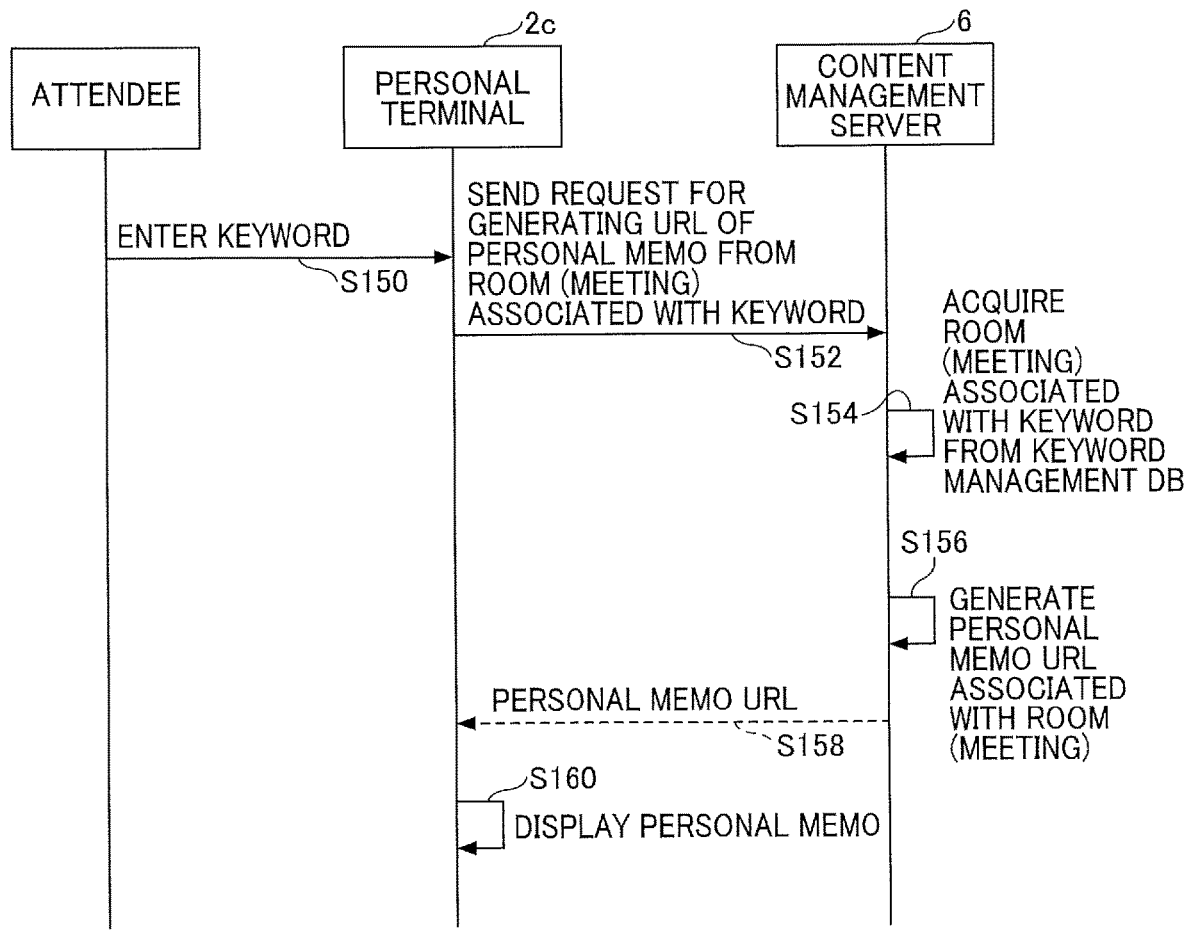
FIG. 23 is a sequence diagram illustrating an example of steps in an operation of room participation and access to a personal memo URL performed by the information sharing system, according to an embodiment of the present disclosure.

FIG. 23 is a sequence diagram illustrating an example of steps in an operation of room participation and access to the personal memo URL performed by the information sharing system, according to the present embodiment. The personal terminal 2b is omitted in FIG. 23, in order to simplify the drawings.

In step S150, the attendee enters the keyword distributed by the presenter or the like (for example, "abc_20190101_1200") on a UI displayed on the personal terminal 2c, the UI being distributed from the content management server 6.

Figure 24:
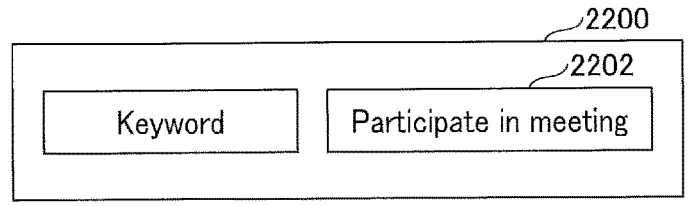
FIG. 24 is an illustration of an example of a UI on which a keyword is entered when participating in the room, according to an embodiment of the present disclosure.

FIG. 24 is an illustration of an example of a UI 2200 on which the keyword is entered when participating in the room. The attendee enters the keyword on the UI 2200 illustrated in FIG. 24, for example, and then presses a meeting participation button 2202. In another example, the attendee enters the URL including the keyword on the web browser. In still another example, the attendee activates an application configured to decode a URL from the two-dimensional code, to cause the application to read a two-dimensional code obtained by encoding the URL.

The operation proceeds to step S152, and the personal terminal 2c transmits, to the content management server 6, a request for generating a personal memo URL of the room (meeting) associated with the keyword. In step S154, the access information generation unit 73 of the content management server 6 searches the keyword management DB 6005 to acquire the room (meeting) ID associated with the keyword.

In step S156, the access information generation unit 73 generates the personal memo URL associated with the acquired room (meeting) ID. In step S158, the access information generation unit 73 transmits the generated personal memo URL to the personal terminal 2c.

In step S160, the personal terminal 2c opens the received personal memo URL, to display the personal memo dm for the attendee operating the personal terminal 2c, whereby allowing the attendee to participate in the room (meeting).

As described heretofore, according to the second embodiment, the keyword (including the base keyword) associated with the generated room (meeting) ID is generated by a simple operation, and distribution of the generated keyword to participants in a meeting makes it easy to participate in a sudden meeting.

Other Embodiments

Figure 16:
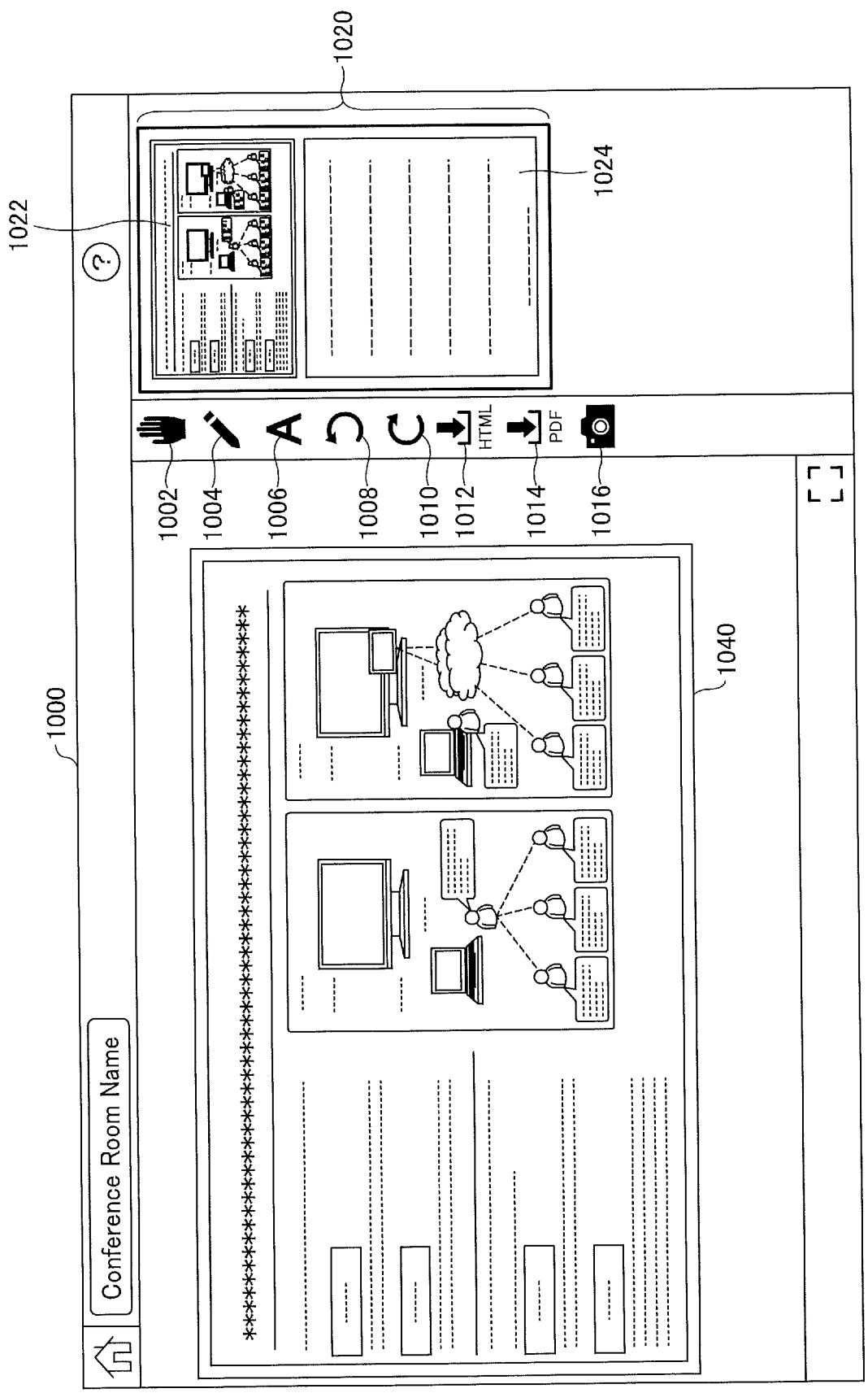
FIG. 16 is an illustration of an example of a UI of the information sharing system, according to an embodiment of the present disclosure.

The personal terminal 2b and the personal terminal 2c of the attendees may display a UI 1000 illustrated in FIG. 16, for example, instead of the UI 1500 illustrated in FIG. 14. FIG. 16 is an illustration of an example of the UI 1000 of the information sharing system, according to the present embodiment. Since a part of the UI 1000 illustrated in FIG. 16 is the same as the UI 1000 illustrated in FIG. 15, and thus description thereof is omitted as appropriate.

Similar to the UI 1000 illustrated in FIG. 15, the UI 1000 illustrated in FIG. 16 includes an image of the shared screen ss as the shared screen 1040 in the projection area on the left side. Further, in the UI 1000 of FIG. 16, a set of the capture image 1022 obtained according to the operations described above with reference to the patterns A pattern E and the text memo area 1024 accompanied with the capture image 1022 is displayed on the sheet 1020 on the right side.

In another example of the information sharing system according to the present embodiment, not only the presenter and the representative but also the attendee may request the capture shooting. The attendee presses the capture button 1016 to instruct the personal terminal 2 to shoot a capture image of the shared screen 1040 displayed in the projection area. While viewing the shared screen 1040 displayed on the UI 1000, the attendee performs an operation of pressing the capture button 1016 at the timing at which the attendee wants to take a capture image. In response to accepting the operation of pressing the capture button 1016, the attendee's personal terminal 2 shoots a capture image of the shared screen 1040 at the current time. The personal terminal 2 displays the shot capture image as the UI 1000 of FIG. 16 and transmits the shot capture image to the content management server 6.

Thus, the information sharing system according to the present embodiment has the personal terminal 2 or the personal terminals 2 of the attendee(s) to acquire the capture image that the attendee wants to shoot, as well as a capture image intended by the presenter or the representative. For example, the information sharing system according to the present embodiment forcibly has the attendee(s) to acquire a catalog of products or the like that the presenter or the representative wants the attendee to acquire as a capture image, based on the operation by the presenter or the representative.

Figure 17:
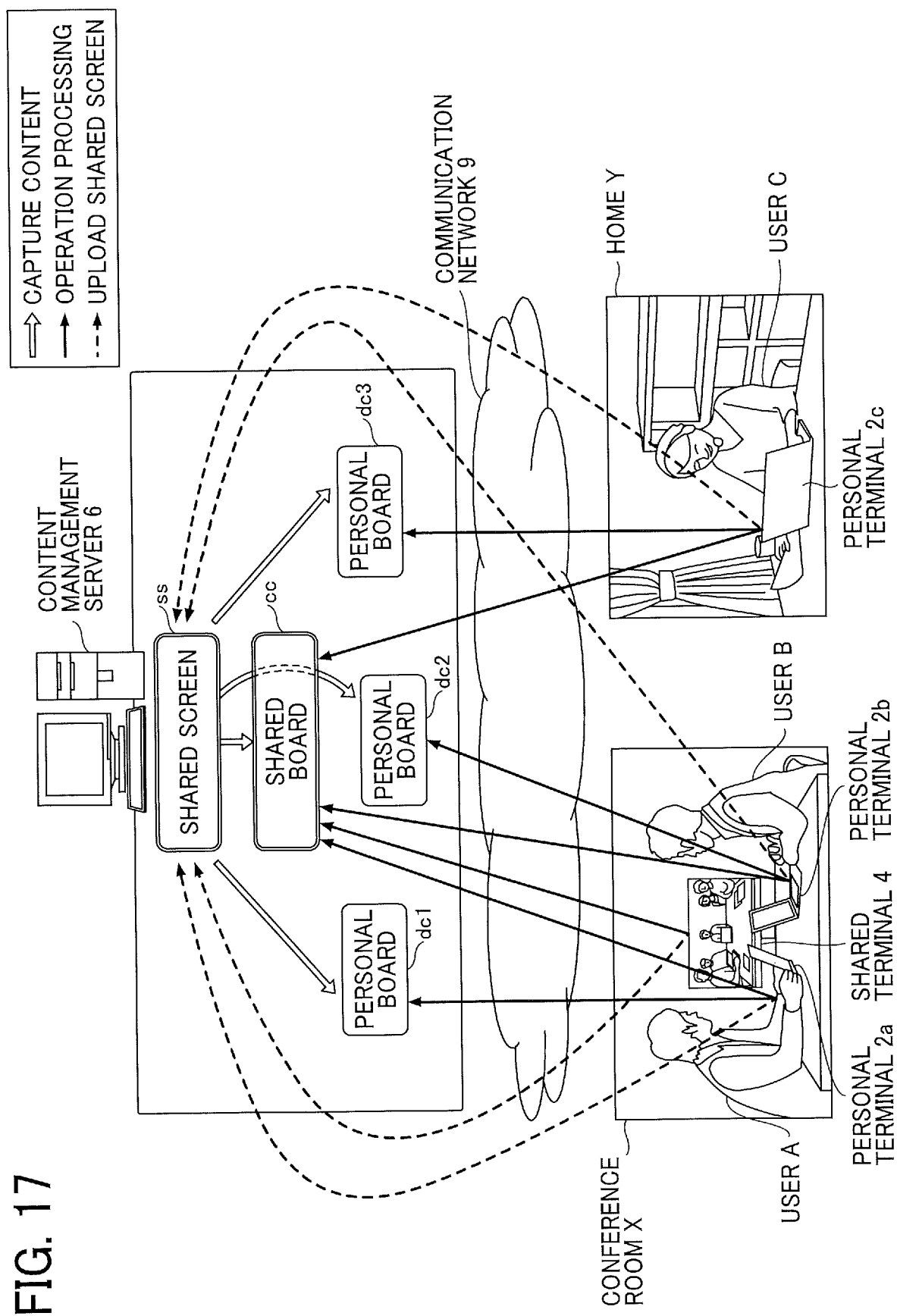
FIG. 17 is a schematic diagram illustrating an overview of an information sharing system used in a meeting being conducted, according to an embodiment of the present disclosure.

Further, the information sharing system illustrated in FIG. 1 is one example, and the embodiments are not limited thereto. In another example, the information sharing system may have a configuration as illustrated in FIG. 17. FIG. 17 is a schematic diagram illustrating an overview of the information sharing system used in a meeting being conducted, according to the present embodiment. FIG. 17 illustrates a case in which the user A and the user B who are in the meeting room X of a company and the user C who is at a home Y are conducting a remote meeting by using the information sharing system. The user A uses the personal terminal 2a in the meeting room X, and the user B uses the personal terminal 2b in the meeting room X. On the other hand, the user C uses the personal terminal 2c at the home Y.

Further, a shared terminal 4 that can be shared by multiple users is provided in the meeting room X. The shared terminal 4 is a computer that multiple users can use together and whose screen is viewed by the multiple users. Examples of the shared terminal 4 includes, but not limited to a projector (PJ), an interactive whiteboard (IWB), a digital signage, a display to which a stick PC is connected. The IWB is a whiteboard having an electronic whiteboard function having mutual communication capability. The shared terminal 4 is an example of a communication terminal (or an information processing terminal). The shared terminal 4 is communicable with the content management server 6 through the communication network 9 such as the Internet.

The content management server 6 is a computer functioning as a web server (or HTTP server) that stores and manages data of contents to be transmitted to the personal terminal 2 and the shared terminal 4. The storage unit 6000 includes, in addition to the configuration of FIG. 1, a storage location (or storage area) for implementing a shared board cc, which is accessible from any personal terminals 2.

The "shared board cc" is a virtual space generated in the storage location (or the storage area) in the storage unit 6000 of the content management server 6. For example, the shared board cc is accessible by using a web application having a function of allowing a user to view and edit contents with the Canvas element and JavaScript (registered trademark). The "web application" refers to software used on a web browser. The web application is implemented by a program written in a script language such as JavaScript (registered trademark) that operates on the web browser and a program on a web server side, which operate in cooperation with each other. Further, the web application refers to a mechanism that implements such software. The shared board cc has a finite or an infinite area within the range of the storage area in the storage unit 6000. For example, the shared board cc may be finite or infinite both in the vertical and horizontal directions. In another example, the shared board cc may be finite or infinite in either the vertical direction or the horizontal direction.

Figure 5:
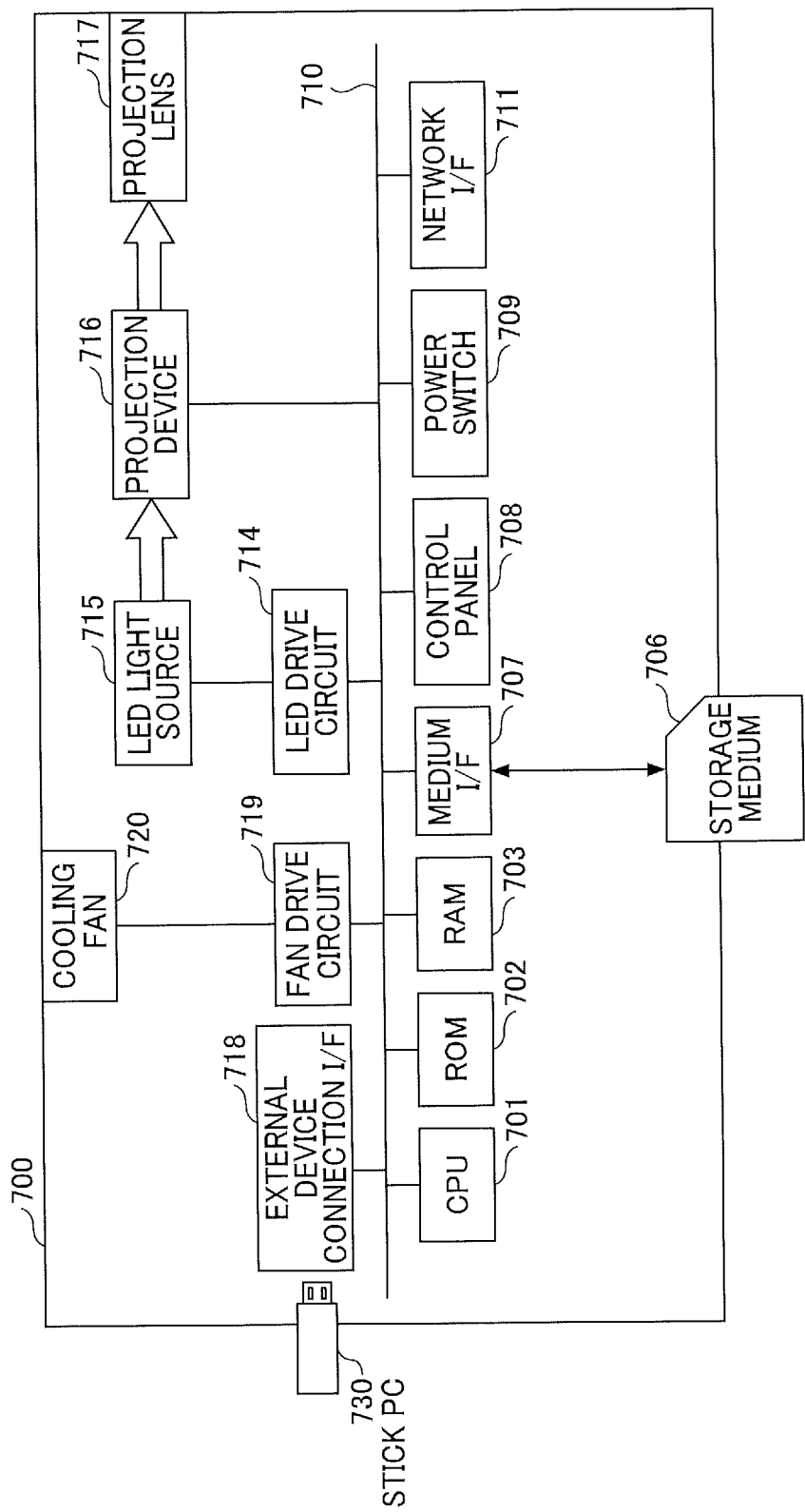
FIG. 5 is a block diagram illustrating an example of a hardware configuration of a projector, according to an embodiment of the present disclosure.

A projector 700, which is an example of the shared terminal 4, may be implemented by a hardware configuration illustrated in FIG. 5, for example.

FIG. 5 is a block diagram illustrating an example of a hardware configuration of the projector 700, according to the present embodiment. As illustrated in FIG. 5, the projector 700 includes a CPU 701, a ROM 702, a RAM 703, a medium I/F 707, a control panel 708, a power switch 709, a bus line 710, a network/F 711, a light emitting diode (LED) drive circuit 714, an LED light source 715, a projection device 716, a projection lens 717, an external device connection I/F 718, a fan drive circuit 719, and a cooling fan 720.

The CPU 701 controls entire operation of the projector 700. The ROM 702 stores a control program for controlling the CPU 701. The RAM 703 is used as a work area for the CPU 701. The medium I/F 707 controls reading or writing of data with respect to a storage medium 706 such as a flash memory.

The control panel 708 is provided with various keys, buttons, LEDs, and the like, and is used for performing various operations other than controlling the power of the projector 700 by the user. For example, the control panel 708 receives an instruction operation such as an operation for adjusting the size of a projected image, an operation for adjusting a color tone, an operation for adjusting a focus, and an operation for adjusting a keystone, and outputs the received operation content to the CPU 701.

The power switch 709 is a switch for switching on or off the power of the projector 700. Examples of the bus line 710 include, but not limited to, an address bus and a data bus, which electrically connects the components illustrated in FIG. 5 such as the CPU 701. The network I/F 711 is an interface for performing data communication using the communication network 9 such as the Internet.

The LED drive circuit 714 controls turning on and off of the LED light source 715 under the control of the CPU 701. When turned on under the control of the LED drive circuit 714, the LED light source 715 emits projection light to the projection device 716. The projection device 716 transmits modulated light obtained by modulating the projection light from the LED light source 715 by the spatial light modulation method based on image data provided through the external device connection I/F 718 and the like, through the projection lens 717, whereby an image is projected on a projection surface of the screen. A liquid crystal panel or a digital micromirror device (DMD) is used as the projection device 716, for example.

The LED drive circuit 714, the LED light source 715, the projection device 716, and the projection lens 717 function as a projection unit that projects an image on the projection surface based on image data.

The external device connection I/F 718 is directly connected to a PC and acquires a control signal and image data from the PC. The external device connection I/F 718 is an interface circuit that connects the projector 700 to various external devices such as a stick PC 730. The fan drive circuit 719 is connected to the CPU 701 and the cooling fan 720 and drives or stops the cooling fan 720 based on a control signal from the CPU 701. The cooling fan 720 rotates to exhaust air inside the projector 700, whereby cooling the inside of the projector 700.

When the power is supplied, the CPU 701 starts up according to a control program stored in advance in the ROM 702, supplies a control signal to the LED drive circuit 714 to turn on the LED light source 715, and supplies a control signal to the fan drive circuit 719 to rotate the cooling fan 720 at a rated speed. Further, when supply of power from the power supply circuit is started, the projection device 716 enters an image displayable state, and power is supplied from the power supply circuit to various other components of the projector 700. When the power switch 709 of the projector 700 is turned off, a power-off signal is sent from the power switch 709 to the CPU 701.

In response to detection of the power-off signal, the CPU 701 supplies a control signal to the LED drive circuit 714 to turn off the LED light source 715. Then, when a predetermined time period elapses, the CPU 701 transmits a control signal to the fan drive circuit 719 to stop the cooling fan 720. Further, the CPU 701 terminates its own control processing, and finally transmits an instruction to the power supply circuit to stop supplying power.

Figure 6:
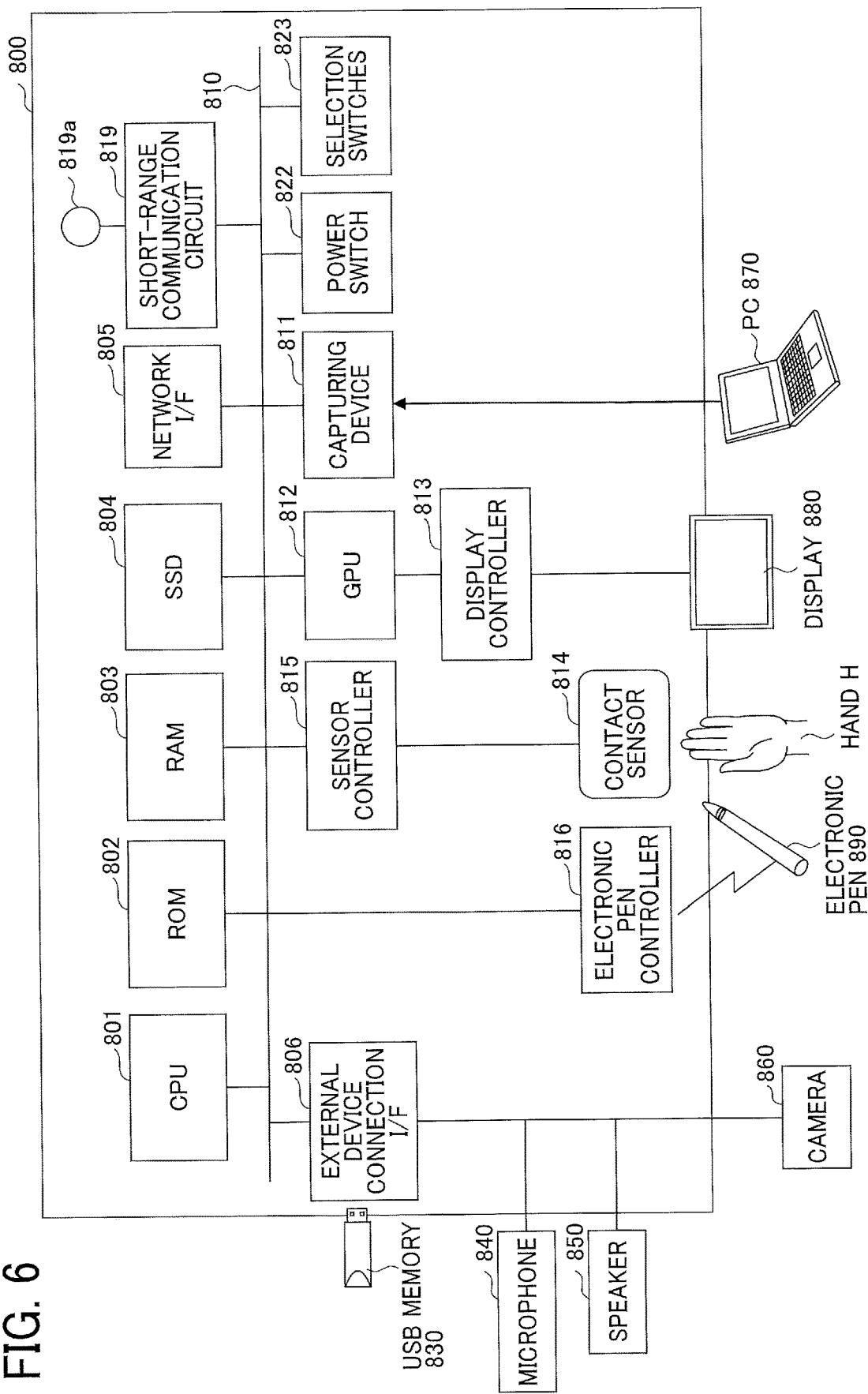
FIG. 6 is a block diagram illustrating an example of a hardware configuration of an interactive whiteboard (IWB), according to an embodiment of the present disclosure.

IWB:

An IWB 800, which is an example of the shared terminal 4, may be implemented by a hardware configuration illustrated in FIG. 6, for example.

FIG. 6 is a block diagram illustrating an example of a hardware configuration of the IWB 800, according to the present embodiment. As illustrated in FIG. 6, the IWB 800 includes a CPU 801, a ROM 802, a RAM 803, a solid state drive (SSD) 804, a network I/F 805, and an external device connection I/F 806.

The CPU 801 controls entire operation of the IWB 800. The ROM 802 stores a control program for controlling the CPU 801, such as an IPL. The RAM 803 is used as a work area for the CPU 801. The SSD 804 stores various data such as the control program for the IWB. The network I/F 805 controls communication with the communication network 9. The external device connection I/F 806 is an interface that connects the IWB to various external devices. Examples of the external devices include, but not limited to, a USB memory 830, a microphone 840, a speaker 850, and a camera 860.

The IWB 800 further includes a capturing device 811, a graphics processing unit (GPU) 812, a display controller 813, a contact sensor 814, a sensor controller 815, an electronic pen controller 816, a short-range communication circuit 819, an antenna 819a for the short-range communication circuit 819, a power switch 822, and selectable switches 823.

The capture device 811 causes a display of an external PC 870 to display video data as a still image or a moving image. The GPU 812 is a semiconductor chip dedicated to graphics processing. The display controller 813 controls display of an image processed at the GPU 812 for output through a display 880 provided with the IWB 800.

The contact sensor 814 detects a touch on the display 880 by an electronic pen 890 or a user's hand H. The sensor controller 815 controls operation of the contact sensor 814. The contact sensor 814 senses a touch input to a particular coordinate on the display 820 using the infrared blocking system. More specifically, the display 880 is provided with two light receiving elements disposed on both upper side ends of the display 880, and a reflector frame surrounding the sides of the display 880. The light receiving elements emit a plurality of infrared rays in parallel to a surface of the display 880. The light receiving elements receive lights passing in the direction that is the same as an optical path of the emitted infrared rays, which are reflected by the reflector frame.

The contact sensor 814 outputs an identifier (ID) of the infrared ray that is blocked by an object (such as the user's hand) after being emitted from the light receiving elements, to the sensor controller 815. Based on the ID of the infrared ray, the sensor controller 815 detects a particular coordinate that is touched by the object. The electronic pen controller 816 communicates with the electronic pen 890 to detect a touch by the tip or bottom of the electronic pen 890 to the display 880. The short-range communication circuit 819 is a communication circuit that communicates in compliance with the NFC, the Bluetooth, and the like. The power switch 822 turns on or off the power of the IWB 800. The selection switches 823 are a group of switches for adjusting brightness, hue, etc., of display on the display 880, for example.

The IWB 800 further includes a bus line 810. Examples of the bus line 810 include, but not limited to, an address bus and a data bus, which electrically connects components illustrated in FIG. 6 such as the CPU 801.

The contact sensor 814 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition or in alternative to detecting a touch by the tip or bottom of the electronic pen 890, the electronic pen controller 816 may also detect a touch by another part of the electronic pen 890, such as a part held by a hand of the user.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above. For example, the information sharing system according to the embodiments can be used in the following situations.

In general seminars, customers correspond to the attendees of the embodiments, and a salesperson corresponds to the presenter or representative of the embodiments. When the information sharing system is used in schools, students correspond to the attendees of the embodiments, and a teacher correspond to the presenter or representative of the embodiments. In general meetings, employees correspond to the attendees of the embodiments, and management corresponds to the presenter or representative of the embodiments.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

In the information processing system according to the related art, when the presenter uses presentation material other than the electronic files stored in the storage device on the network, the attendees have to obtain the presentation material. Further, in the information processing system according to the related art, when the presenter uses the electronic files stored in the storage device on the network as presentation material, the attendees have to obtain the presentation material.

According to one or more embodiments of the present disclosure, an information processing system is provided that is configured to reduce efforts of acquiring an image of a shared screen.

The capture determination unit 69 is an example of capture determination means. The generation unit 64 is an example of generation means. The data exchange unit 61 is an example of transmission means. The display control unit 24*b* and the display control unit 24*c* are examples of display control means. The image processing unit 63, the image processor 23*b*, and the image processor 23*c* are examples of image processing means. The data exchange unit 21*b* and the data exchange unit 21*c* is an example of receiving means. The capture shooting request of the shared screen 1040 is an example of a capture request.

The base keyword is an example of a first keyword. The keyword is an example of a second keyword. The room (meeting) ID is an example of virtual room identification information. The keyword registration unit 72 is an example of keyword registration means. The access information generation unit 73 is an example of access information generation means.

What is claimed is:

1. An information processing system comprising:
a plurality of communication terminals, each installed with a web browser; and
an information processing apparatus comprising first circuitry configured to
determine occurrence of a trigger to capture an image of a shared screen to be shared by the plurality of communication terminals,
generate data of a web page including the image of the shared screen captured based on the occurrence of the trigger,
transmit a notification indicating a captured shared screen to the plurality of communication terminals,
receive, from at least one of the plurality of communication terminals, a request for acquiring the captured shared screen in response to the notification, and
transmit the data of the web page to the plurality of communication terminals,
each of the plurality of communication terminals comprising second circuitry configured to display the web page including the image of the shared screen based on the data received from the information processing apparatus,
wherein the occurrence of the trigger for capturing the capture image of the shared screen is detected based on a change in a page number read from the page number inserted in the shared screen.

2. The information processing system of claim 1, wherein the first circuitry of the information processing apparatus is further configured to:
capture the image of the shared screen based on the occurrence of the trigger; and
determine that the trigger has occurred in response to acceptance of a capture request from one communication terminal of the plurality of communication terminals.

3. The information processing system of claim 1, wherein the first circuitry of the information processing apparatus is further configured to: capture the image of the shared screen based on the occurrence of the trigger; and
determine that the trigger has occurred based on determination that the image of the shared screen has changed.

4. The information processing system of claim 3, wherein the first circuitry of the information processing apparatus is configured to determine that the image of the shared screen has changed at least one of when an amount of change in the image of the shared screen is equal to or greater than a threshold value and when page identification information read from the image of the shared screen has changed.

5. The information processing system of claim 1, wherein the second circuitry of each of the plurality of communication terminals is further configured to capture the image of the shared screen based on the occurrence of the trigger, and
the first circuitry of the information processing apparatus determines that the trigger has occurred in response to acceptance of a capture request from one communication terminal of the plurality of communication terminals.

6. The information processing system of claim 1, wherein the second circuitry of each of the plurality of communication terminals is further configured to capture the image of the shared screen based on the occurrence of the trigger, and
the first circuitry of the information processing apparatus determines that the trigger has occurred based on determination that the image of the shared screen has changed.

7. The information processing system of claim 1, wherein the first circuitry of the information processing apparatus is configured to identify the plurality of communication terminals associated with a virtual room that shares the image of the shared screen, and to transmit the data of the web page to the identified plurality of communication terminals.

8. The information processing system of claim 1, wherein the first circuitry of the information processing apparatus is further configured to:
register a second keyword in association with virtual room identification information, the second keyword including a first keyword that is associated with a creator who creates a virtual room that shares the image of the shared screen;
identify the virtual room based on the virtual room identification information registered in association with the second keyword received from one communication terminal of the plurality of communication terminals;
generate access information that allows the one communication terminal to participate in the identified virtual room; and
transmit the access information to the one communication terminal.

9. The information processing system of claim 8, wherein the first circuitry of the information processing apparatus is configured to generate the data of the web page for a participant who participates in the virtual room by the one communication terminal based on an access request transmitted from the one communication terminal using the access information.

10. The information processing system of claim 8, wherein
the first keyword is registered by the creator as one of information items that the creator needs to register in order to use the information processing system.

11. The information processing system of claim 1, wherein the occurrence of the trigger includes regular intervals.

12. An information processing apparatus communicably connected with a plurality of communication terminals, the information processing apparatus comprising circuitry configured to:
determine occurrence of a trigger to capture an image of a shared screen to be shared by the plurality of communication terminals;
generate data of a web page including the image of the shared screen captured based on the occurrence of the trigger;
transmit a notification indicating a captured shared screen to the plurality of communication terminals;
receive, from at least one of the plurality of communication terminals, a request for acquiring the captured shared screen in response to the notification;
transmit the data of the web page to the plurality of communication terminals, to cause the plurality of communication terminals to display the web page including the image of the shared screen,
wherein the occurrence of the trigger for capturing the capture image of the shared screen is detected based on a change in a page number read from the page number inserted in the shared screen.

13. An information processing method performed by an information processing apparatus communicably connected with a plurality of communication terminals, the information processing method comprising:
determining occurrence of a trigger to capture an image of a shared screen to be shared by the plurality of communication terminals;
generating data of a web page including the image of the shared screen captured based on the occurrence of the trigger;
transmit a notification indicating a captured shared screen to the plurality of communication terminals;
receive, from at least one of the plurality of communication terminals, a request for acquiring the captured shared screen in response to the notification; and
transmitting the data of the web page to the plurality of communication terminals, to cause the plurality of communication terminals to display the web page including the image of the shared screen,
wherein the occurrence of the trigger for capturing the capture image of the shared screen is detected based on a change in a page number read from the page number inserted in the shared screen.

\* \* \* \* \*